US005974195A

United States Patent [19]

Kawazome et al.

[11] Patent Number: 5,974,195

[45] **Date of Patent: *Oct. 26, 1999**

[54] IMAGE PROCESSING APPARATUS AND METHOD

[75] Inventors: Takeshi Kawazome, Utsunomiya; Yoshihiro Ishida; Shinichiro Koga, both of Kawasaki; Nobuyuki Shigeeda, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/543,310

[22] Filed: Oct. 16, 1995

[30] Foreign Application Priority Data

| | | | |
|---|---|---|---|
| Oct. 14, 1994 | [JP] | Japan | 6-249135 |
| Dec. 22, 1994 | [JP] | Japan | 6-320947 |

[51] Int. Cl.[6] .............................. G06K 9/40; G06K 9/48; G06K 9/32; H04N 1/40

[52] U.S. Cl. .......................... 382/266; 382/199; 382/254; 382/263; 382/298; 358/447

[58] Field of Search .................................... 382/176, 266, 382/298, 500, 254, 199, 200, 263; 358/433, 444

[56] References Cited

U.S. PATENT DOCUMENTS

| | | | |
|---|---|---|---|
| 5,485,529 | 1/1996 | Kurita et al. | 358/500 |
| 5,515,179 | 5/1996 | Yamakawa et al. | 358/447 |
| 5,644,366 | 7/1997 | Ushida et al. | 382/176 |

FOREIGN PATENT DOCUMENTS

| | | |
|---|---|---|
| 04157578 | 4/1992 | Japan . |
| 4157578 | 5/1992 | Japan . |
| 05020466 | 1/1993 | Japan . |
| 05020467 | 1/1993 | Japan . |
| 05020468 | 1/1993 | Japan . |
| 520466 | 1/1993 | Japan . |
| 520467 | 1/1993 | Japan . |
| 520468 | 1/1993 | Japan . |
| 05040831 | 2/1993 | Japan . |
| 540831 | 2/1993 | Japan . |
| 05174140 | 7/1993 | Japan . |

*Primary Examiner*—Phuoc Tran
*Assistant Examiner*—Daniel G. Mariam
*Attorney, Agent, or Firm*—Fitzpatrick Cella Harper & Scinto

[57] ABSTRACT

The contour vectors of an image are stored in a small storage capacity, and are enlarged/reduced in correspondence with a desired variable-magnification factor to be faithful to an input image. For this purpose, when a binary image is input from a binary image input unit (11), a contour vector extraction unit extracts contour vectors, and detects the positions of isolated points. The contour vectors are enlarged/reduced by a vector variable-magnification/ smoothing unit (13), and a binary image is reproduced by a binary image reproduction unit (15). On the other hand, each of the isolated points is subjected to variable-magnification processing by an isolated point variable-magnification processing unit (14), so that its position is converted into a position corresponding to the variable-magnification factor, and points corresponding in number to the variable-magnification factor form the isolated point. Thus, the storage capacity of the isolated points can be reduced, and the isolated points are subjected to variable-magnification processing at an appropriate variable-magnification factor corresponding to the desired variable-magnification factor.

24 Claims, 35 Drawing Sheets

EXAMPLE OF COARSE CONTOUR VECTOR LOOPS REPRESENTING

IMAGE PROCESSING APPARATUS AND METHOD

BACKGROUND OF THE INVENTION

Conventionally, an image processing technique of extracting the contour lines of a raster-input binary image, and storing the binary image as contour vector data expressed by the contour lines has been proposed.

Furthermore, for a pseudo halftone image including many isolated points, a technique of avoiding an increase in memory capacity by separately storing position information of each isolated point on an image in place of storing the contour of each isolated point as vector data one by one has also been proposed as a technique to be added to the above-mentioned one.

In the above-mentioned technique which separately handles isolated points in a pseudo halftone image, when an input image is to be output in an enlarged or reduced scale, each isolated point is finally output by merely increasing the number of pixels to an integer multiple approximate to a desired variable magnification factor. For this reason, if the variable magnification factor is not an integer multiple like ×2.5, the density of a pseudo halftone portion of the output image becomes different from that of the input image.

An image processing technique of extracting the contour lines of a raster-input binary image, and storing the binary image as contour vector data expressed by the contour lines has been conventionally proposed. In association with a technique of this type, the present applicant has already filed Japanese Patent Laid-Open No. 4-157578. Furthermore, a technique of converting a binary image stored as contour vector data into a raster format as a standard data format has also been conventionally proposed. For example, the present applicant filed Japanese Patent Laid-Open Nos. 5-40831, 5-20466, 5-20467, and 5-20468. Also, as a technique of obtaining a satisfactory enlarged/reduced image using contour vector data of a binary image, Japanese Patent Application No. 3-345062 has been proposed.

With the above-mentioned technique of converting a binary image into contour vector data, geometric modification processing such as enlargement/reduction, rotation, and the like can be easily attained. However, a binary image includes components constituted by characters and line images, and pseudo halftone components which express a density pattern, and it is often preferable to adaptively perform processing operations of different algorithms for these components depending on the modification processing contents.

In particular, when the conversion technique is applied to variable-magnification processing like in the technique proposed by Japanese Patent Application No. 3-345062, a satisfactory enlarged/reduced image can be obtained based on an image constituted by character/line image components. However, when the technique of this proposal is directly applied to an image constituted by pseudo halftone components, the image quality suffers. For this reason, adaptive variable-magnification processing must be performed for these two different types of components.

SUMMARY OF THE INVENTION

The present invention has been made in consideration of the above situation, and has as its object to provide an image processing apparatus and method, which can reproduce the black pixel density of an input image even in variable-magnification processing of isolated points separately stored as contour vector data and position information in a pseudo halftone image at a magnification factor which is not an integer multiple.

In order to achieve the above object, an image variable-magnification processing apparatus according to the present invention comprises the following arrangement.

More specifically, an image processing apparatus for generating contour vector data from a binary image and performing image processing, comprises:

- extraction means for extracting contour vectors from the binary image;
- detection means for detecting an isolated point from the contour vectors;
- first storage means for storing the contour vectors of a portion except for the detected isolated point;
- second storage means for storing position information of the detected isolated point;
- binary image reproduction means for enlarging/reducing the contour vectors stored in the first storage means at a desired magnification factor, and reproducing a binary image based on the enlarged/reduced contour vectors;
- isolated point variable-magnification means for enlarging/reducing the isolated point at a desired magnification factor on the basis of the position information of the isolated point stored in the second storage means; and
- synthesizing means for disposing the enlarged/reduced isolated point on the binary image reproduced by the binary image reproduction means.

With the above-mentioned arrangement, an isolated point is stored as information indicating its position, and is enlarged/reduced in corresponding with a desired variable-magnification factor. The pixel of the enlarged/reduced isolated point is disposed on an image reproduced based on contour vector data.

It is another object of the present invention to provide an image processing apparatus and method, which can separate character/line image components and pseudo halftone image components from contour vector data of input binary image data, and can perform processing suitable for these components as post-processing.

In order to achieve the above object, an image processing apparatus of the present invention comprises the following arrangement.

More specifically, an image processing apparatus comprises:

- input means for inputting vector data along a contour of a binary image;
- detection means for detecting a state of vector data constituting each of closed loops, which are constituted by the input vector data; and
- discrimination means for discriminating based on a detection result of the detection means if each of the closed loop represents a character/line image region or a pseudo halftone image region.

It is still another object of the present invention to provide an image processing apparatus and method, which can separate character/line image components and pseudo halftone image components from input binary image data including these components, and can perform modification processing suitable for the respective components.

In order to achieve the above object, an image processing apparatus of the present invention comprises the following arrangement.

More specifically, an image processing apparatus for executing modification processing by extracting contour vector data from an input binary image, comprises:

extraction means for extracting contour vector data along a contour of an input binary image;

detection means for detecting a state of vector data constituting each of closed loops, which are constituted by the input vector data; and discrimination means for discriminating based on a detection result of the detection means if each of the closed loop represents a character/line image region or a pseudo halftone image region, wherein modification processing associated with image processing is performed by modification means suitable for each of the character/line image region and the pseudo halftone image region in correspondence with a discrimination result of the discrimination means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described in detail hereinafter with reference to the accompanying drawings.

First Embodiment

Figure 1:
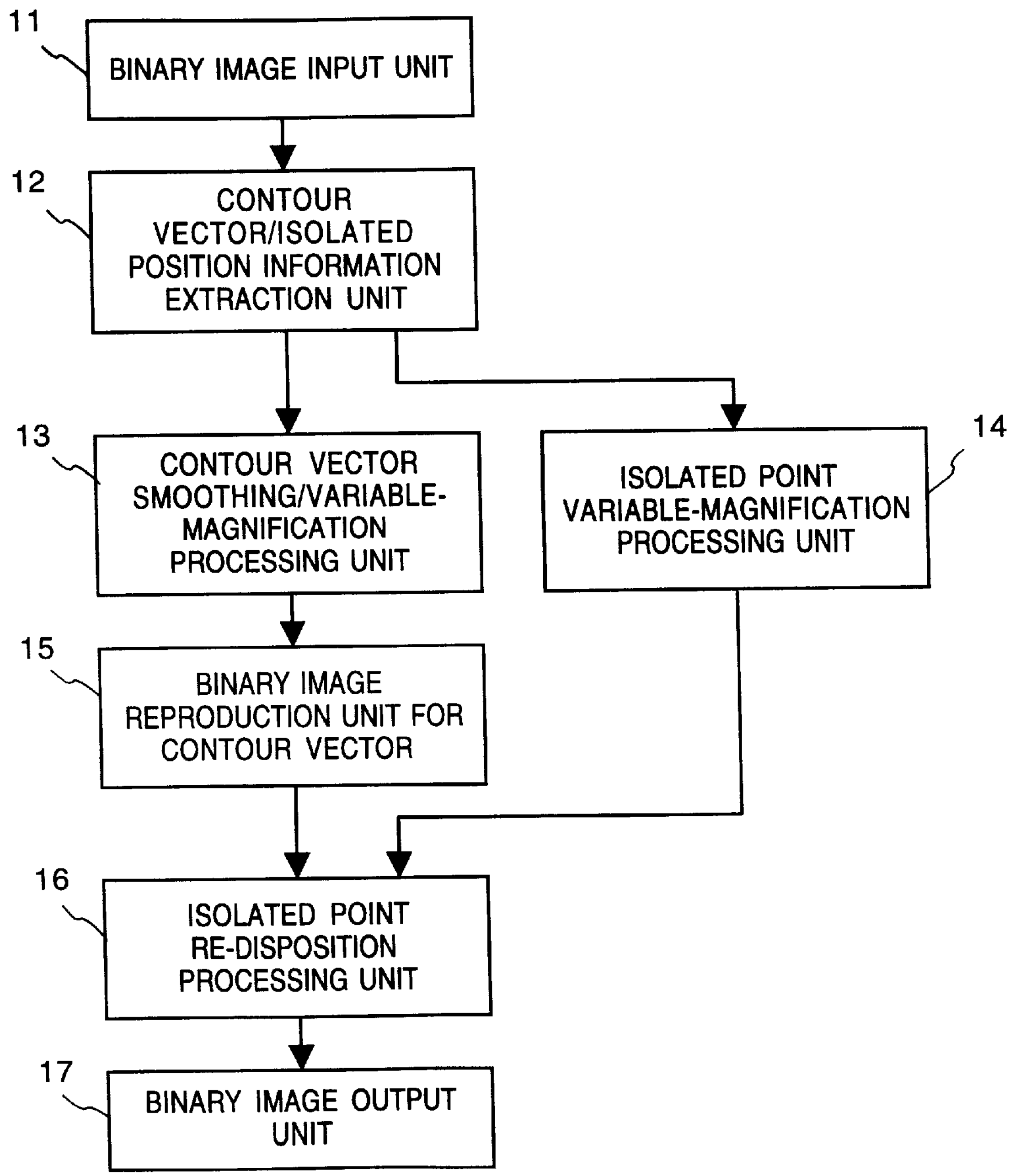
FIG. 1 is a block diagram showing the flow of image processing in the first embodiment.

FIG. 1 is a block diagram showing the flow of the operation of an image variable-magnification processing apparatus according to an embodiment of the present invention. The apparatus shown in FIG. 1 will be described below.

Arrangement of Apparatus

Referring to FIG. 1, reference numeral 11 denotes a binary image input unit which inputs a digital binary image to be subjected to variable-magnification processing in a raster-scanning format. Reference numeral 12 denotes a contour vector/isolated position information extraction unit (to be referred to as a contour vector extraction unit hereinafter), which extracts coarse contour vectors (contour vectors before being subjected to smoothing and variable-magnification processing) from a binary image signal in the raster-scanning format. This unit detects an isolated point parallel to extraction of contour vectors, and extracts its position information. Reference numeral 13 denotes a contour vector smoothing/variable-magnification processing unit for performing smoothing and variable-magnification processing of vectors extracted by the contour vector extraction unit 12. Reference numeral 14 denotes an isolated point variable-magnification processing unit, which calculates a disposition to be used after image variable-magnification processing on the basis of position information of an isolated point separately extracted by the contour vector extraction unit 12, and develops the isolated point to black pixels corresponding in number to a preset variable-magnification factor. Reference numeral 15 denotes a binary image reproduction unit, which reproduces a binary image represented by contour vector data on the basis of the data as data in the raster-scanning format. Reference numeral 16 denotes an isolated point re-disposition processing unit for re-disposing an isolated point enlarged/reduced by the isolated point variable-magnification processing unit 14 on binary image data in the raster-scanning format output from the binary image reproduction unit 15. Reference numeral 17 denotes a binary image output unit for outputting a final variable-magnification processing result. The unit 17 outputs the raster-scanning format data of an enlarged/reduced binary image to a display, a paper sheet, a communication path, or the like.

Operation of Respective Units of Apparatus

In the above-mentioned arrangement, the binary image input unit 11 comprises, e.g., an image reader which reads an image, converts the read image into a binary image, and outputs the binary image in the raster-scanning format. The contour vector extraction unit 12 picks up a pixel of interest from an image in the raster-scanning order, and detects coarse contour vectors of a pixel arrangement based on the pixel of interest and its neighboring pixels in both the horizontal and vertical directions. The unit 12 detects the contour of an image based on the connection state of the detected vectors.

Figure 12:
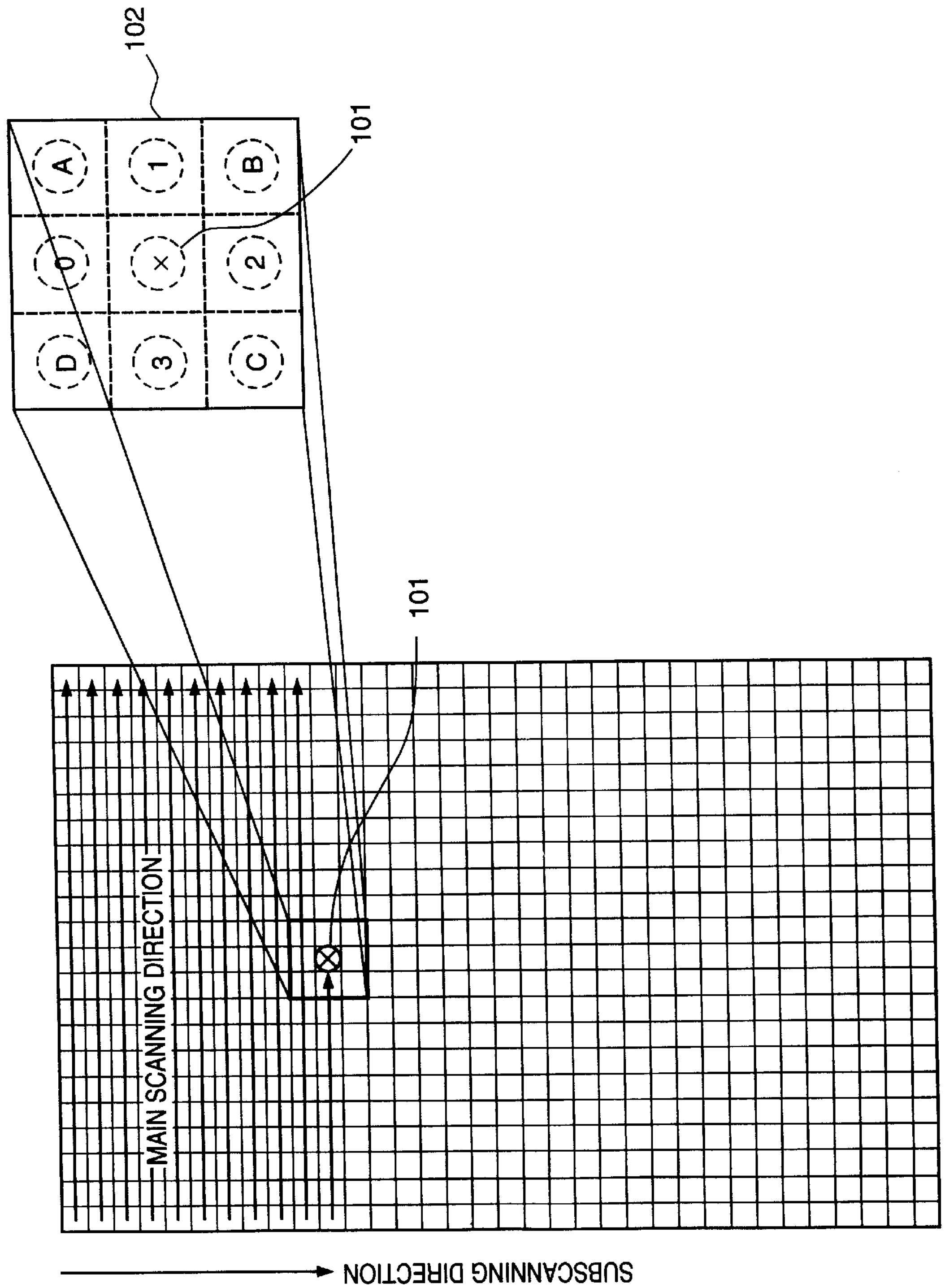
FIG. 12 is a view for explaining a method of extracting contour vectors from a binary image in the raster-scanning format.

FIG. 12 shows the scanning pattern of binary image data in the raster-scanning format output from the binary image input unit 11, and also shows the scanning pattern of binary image data in the raster-scanning format input to the contour vector extraction unit 12. The contour vector extraction unit 12 receives, as input data, binary image data output from the binary image input unit 11 in the above-mentioned format. Referring to FIG. 12, a mark ⊗ indicates a pixel 101 of interest of a binary image which is being raster-scanned, and a nine-pixel region 102 including eight neighboring pixels of the pixel 101 of interest is particularly illustrated in an enlarged scale. The contour vector extraction unit 12 shifts the pixel of interest in the raster-scanning order, and detects contour side vectors (horizontal or vertical vectors) present between the pixel of interest and its neighboring pixels in correspondence with the state (black or white pixels) in the nine-pixel region 102 of each pixel of interest. When contour side vectors are detected, the unit 12 extracts data of the start coordinate positions and directions of the side vectors, and extracts coarse contour vectors while updating the connection relationship among the side vectors.

Figure 13:
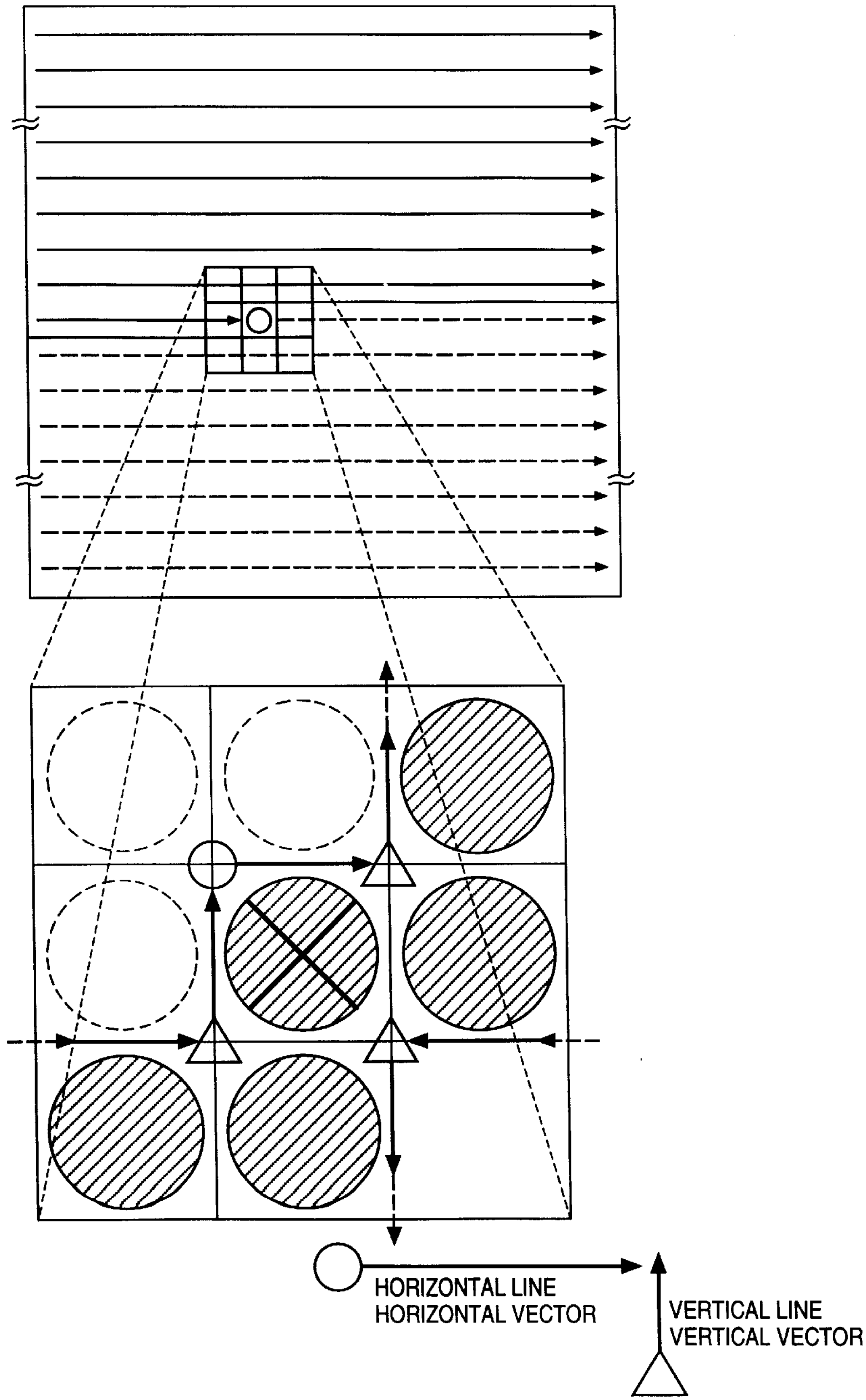
FIG. 13 is a view showing an example of the extraction state of contour side vectors between a pixel of interest and its neighboring pixels.

FIG. 13 shows an example of the extraction state of contour side vectors between the pixel of interest and its neighboring pixels. In FIG. 13, a mark Δ indicates the start point of a vertical vector (the end point of a horizontal vector), and a mark ○ indicates the start point of a horizontal vector (the end point of a vertical vector).

Figure 14:
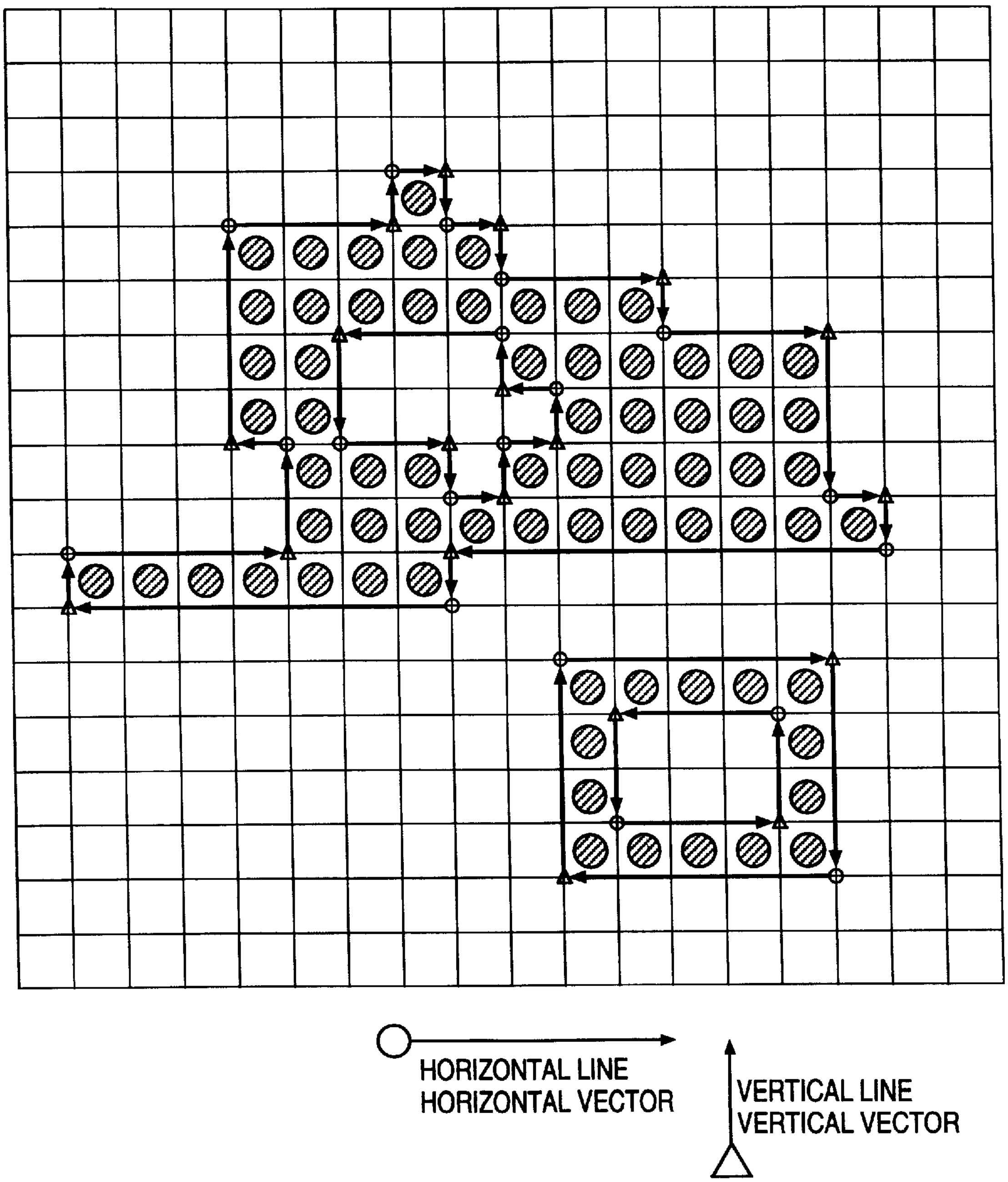
FIG. 14 is a view showing an example of a coarse contour vector loop extracted by a contour vector extraction unit.

FIG. 14 shows an example of a coarse contour vector loop extracted by the contour vector extraction unit 12. In FIG. 14, the squares of a matrix indicate the pixel positions of an input image: blank squares indicate white pixels, and squares with marks ● indicate black pixels. As in FIG. 13, each mark Δ indicates the start point of a vertical vector, and each mark ○ indicates the start point of a horizontal vector. The contour vector extraction unit 12 extracts a coarse contour vector loop which defines a region of coupled black pixels by alternately coupling horizontal and vertical vectors, so as to have a black pixel region on the right side in the directions of vectors.

The start point of each coarse contour vector is extracted as a middle position of a corresponding pixel of an input image, and a line portion having a one-pixel width in an original image is extracted as a coarse contour loop having a significant width. The extracted coarse contour vector loops are output from the contour vector extraction unit 12 in a data format shown in FIG. 15.

Figure 15:
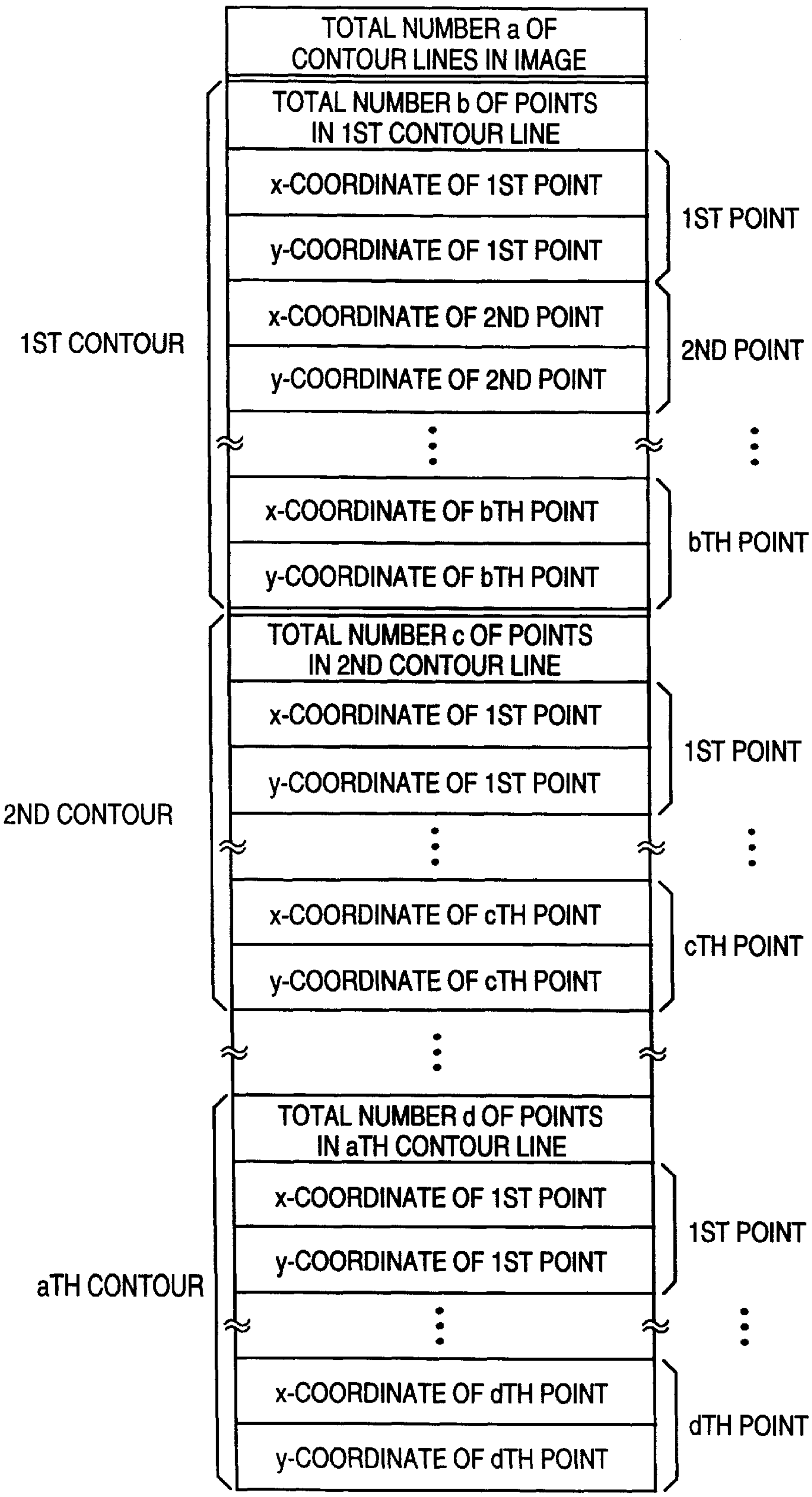
FIG. 15 is a view showing the storage state of contour vector data output from the contour vector extraction unit.

Data shown in FIG. 15 consists of a total number <u>a</u> of coarse contour loops extracted from an image, and a coarse contour loop data group including first to a-th contour loops. Each coarse contour loop data includes the total number of start points of contour side vectors present in the corresponding coarse contour loop (this value may also be considered as the total number of contour side vectors), and a sequence of start point coordinate values (x- and y-coordinate values; the start points of horizontal and vertical vectors alternately appear) of contour side vectors which constitute the loop and are arranged in turn.

Figure 16:
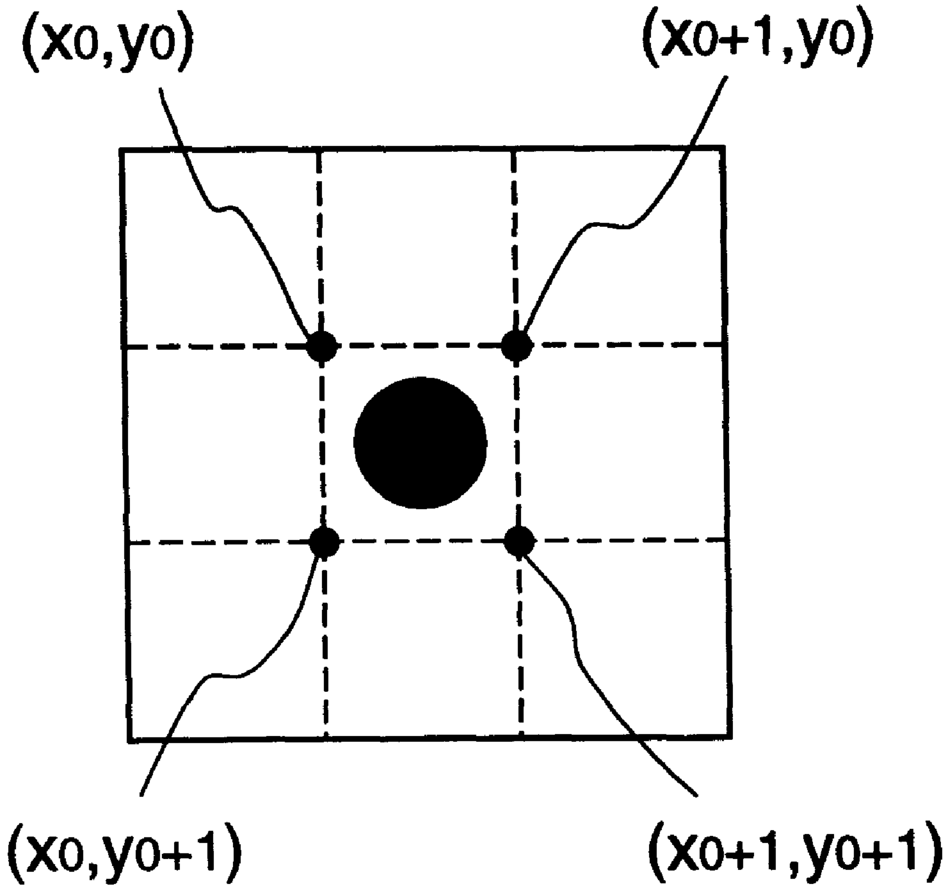
FIG. 16 is a view showing the contour vector coordinate positions in the case of isolated point extraction.

Upon extraction of coarse contour vectors by the contour vector extraction unit 12, when the pixel of interest is a black pixel and its eight neighboring pixels are all white pixels, i.e., when an isolated point shown in FIG. 16 is extracted, the contour vector extraction unit 12 processes this point not as the above-mentioned coarse contour vector but as isolated point data.

Figure 2:
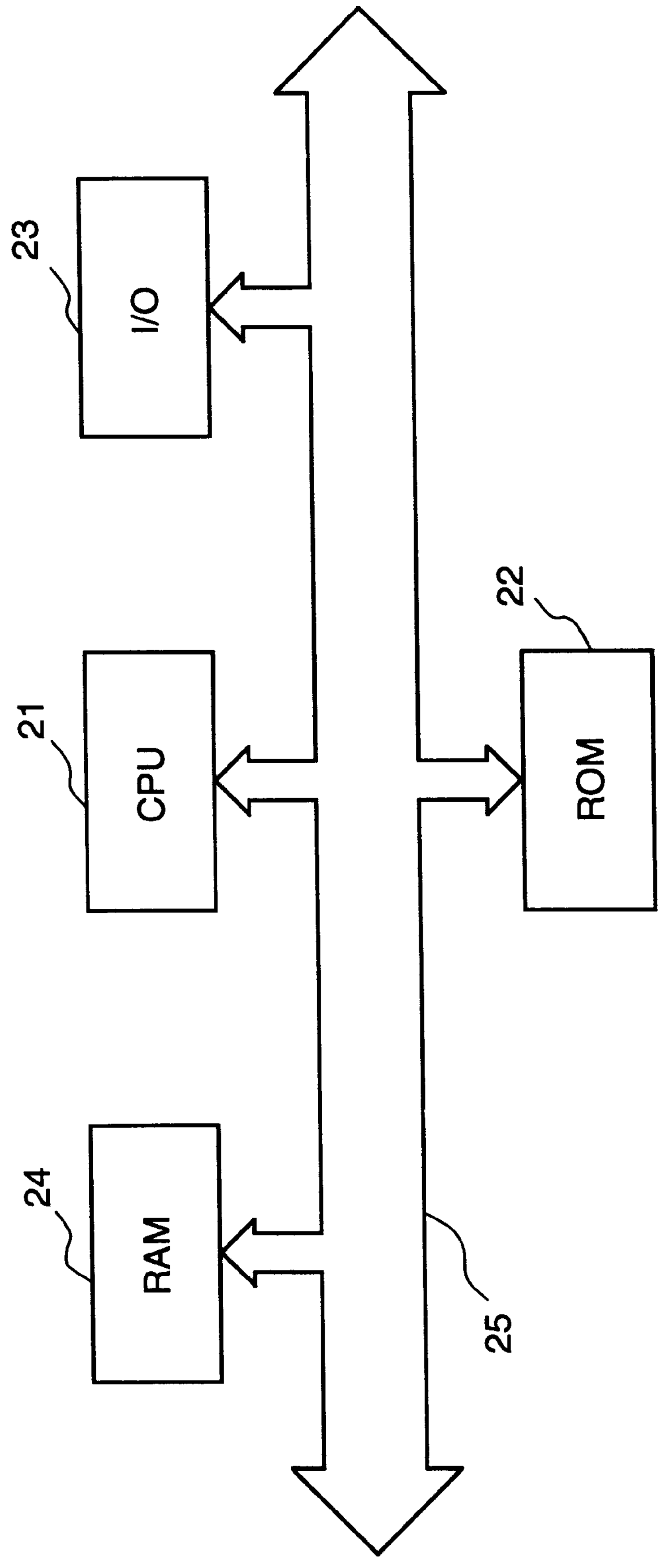
FIG. 2 is a block diagram showing an example of hardware in the first embodiment.

FIG. 2 shows the schematic hardware arrangement of the contour vector extraction unit 12 to the isolated point re-disposition processing unit 16 for performing outline processing in the image processing apparatus of this embodiment. Referring to FIG. 2, a CPU 21 is connected to a ROM 22, an I/O port 23, and a RAM 24 via a bus 25. In this arrangement, the output from the contour vector extraction unit 12 is stored in the RAM 24 in the data format shown in FIG. 15. An isolated point is a pixel surrounded by four points (x0, y0), (x0+1, y0), (x0+1, y0+1), and (x0, y0+1), as shown in FIG. 16. However, as isolated point data, only data (x0, y0) is stored in an isolated point data holding area of the RAM 24 in a format shown in FIG. 3. More specifically, the number Q of isolated points in image data, and the x- and y-coordinate values of the isolated points are stored.

The contour vector extraction unit 12 calculates the difference values between the end and start point coordinate values of vectors representing a contour on the basis of coarse contour vector data extracted from a binary image, and expresses the calculated values as variable-length data, thus generating outline vector data. Vector generation processing is realized by executing the sequence shown in FIG. 17 by the CPU 21 in the arrangement shown in FIG. 2.

Figure 17:
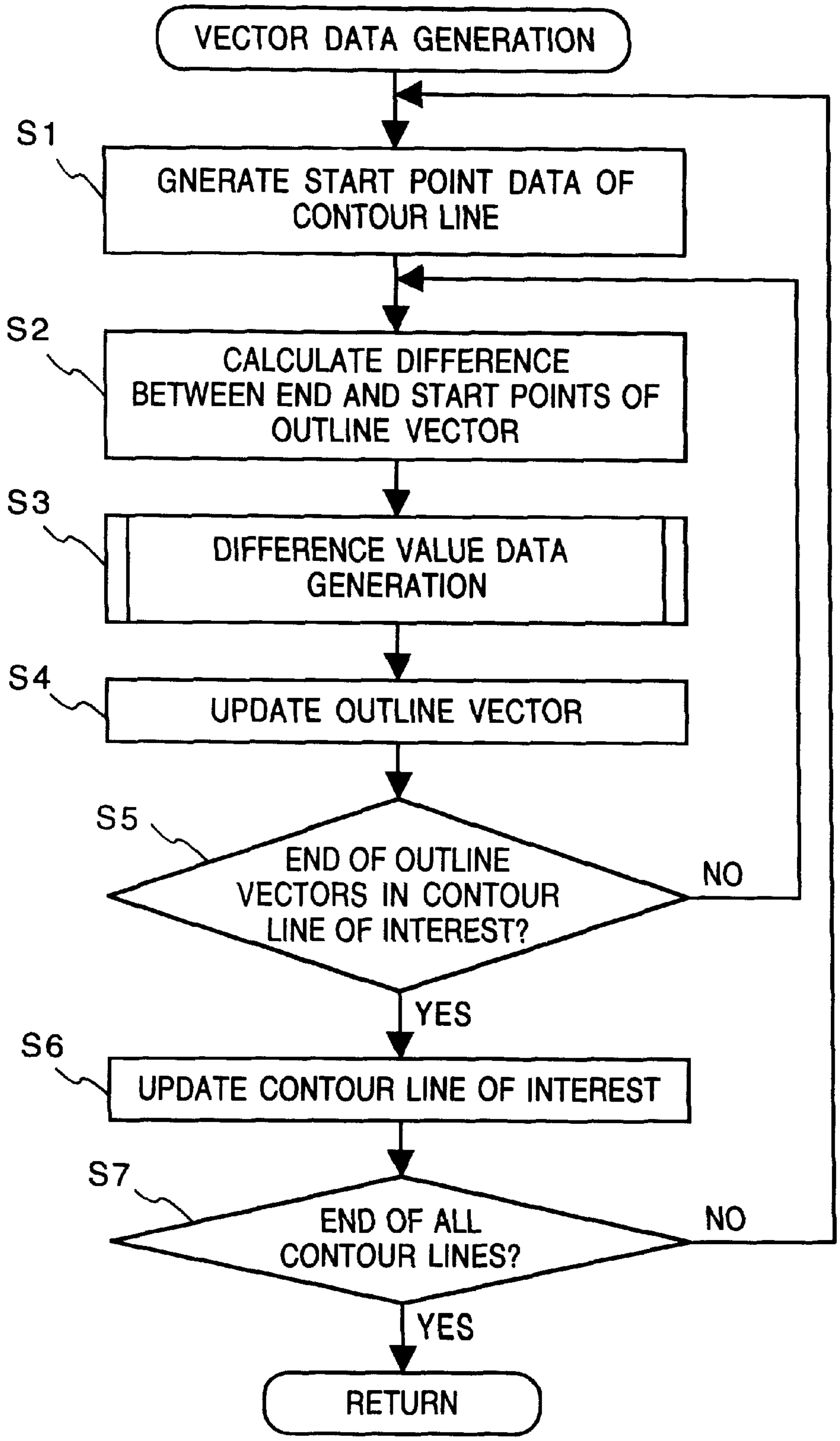
FIG. 17 is a flow chart for explaining the vector data generation processing.
Figure 18:
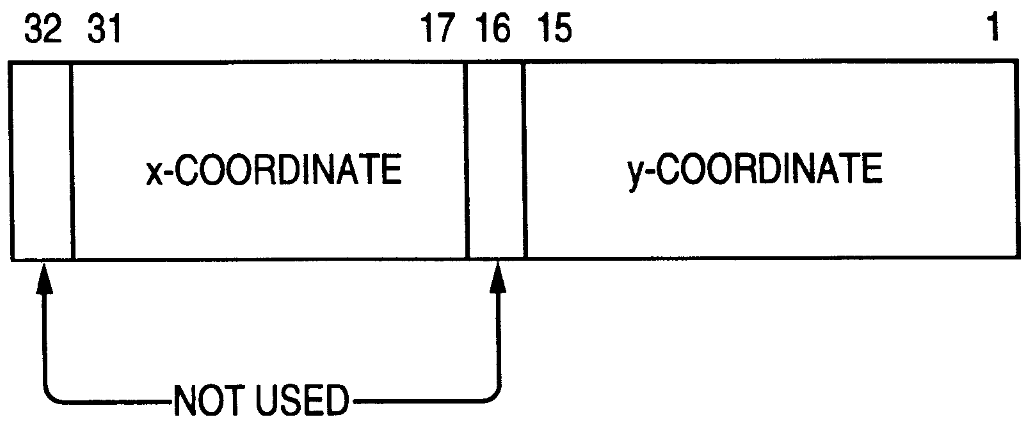
FIG. 18 is a view showing the data format of a contour line start point.
Figure 19:
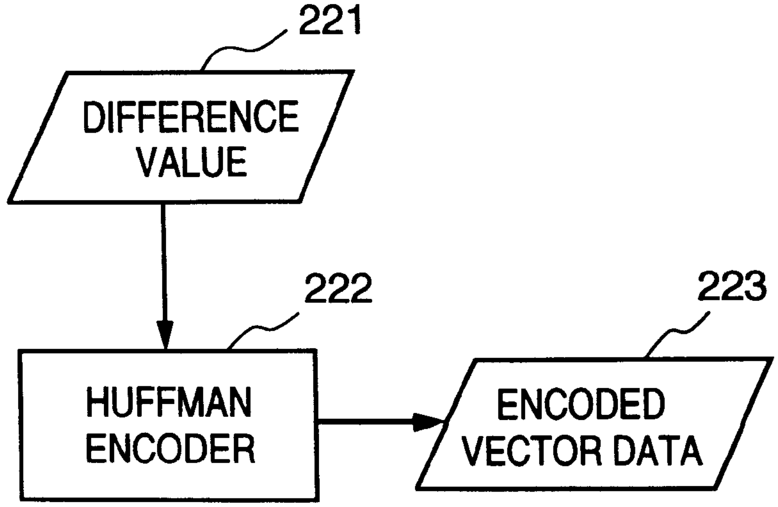
FIG. 19 is a block diagram showing the generation process of encoded vector difference value data.

The vector data generation processing in the contour vector extraction unit 12 will be explained below with reference to FIG. 17. In step S1, start point coordinate value data of a fixed length is generated to have, as a start point, the coordinate position of the first point in the contour line of interest in the data format shown in FIG. 15, and is written in the RAM 24. The start point coordinate value data is 32-bit fixed-length data, as shown in FIG. 18. In this data, the 32nd bit as the MSB and 16th bit are not used, 15 bits from the 17th bit to the 31st bit represent an x-coordinate value, and 15 bits from the first bit to the 15th bit represent a y-coordinate value. Therefore, a coordinate value (x, y) is expressed by a 15-bit unsigned integer.

In step S2, the start point coordinate value is subtracted from the end point coordinate value of the vector of interest to generate x- and y-coordinate difference values. In step S3, data are generated for the coordinate difference values. It can be easily understood that if a normal coordinate expression is considered as a difference from the coordinate origin, the coordinate difference value between adjacent points assumes a smaller value than the normal coordinate expression. For this reason, a coordinate expression using a difference is processed as variable-length data corresponding to a difference value.

In step S4, the vector of interest is incremented by one, and it is checked in step S5 if processing for all vectors in a contour line is completed. If NO in step S5, steps S2 to S4 are repeated to generate coordinate difference value data in units of vectors.

If processing is completed for one contour line, processing for a new contour line is started in step S6, and it is tested in step S7 if processing for all the contour lines is completed. If NO in step S7, the processing in steps S1 to S6 is repeated for a new contour line.

Figure 20:
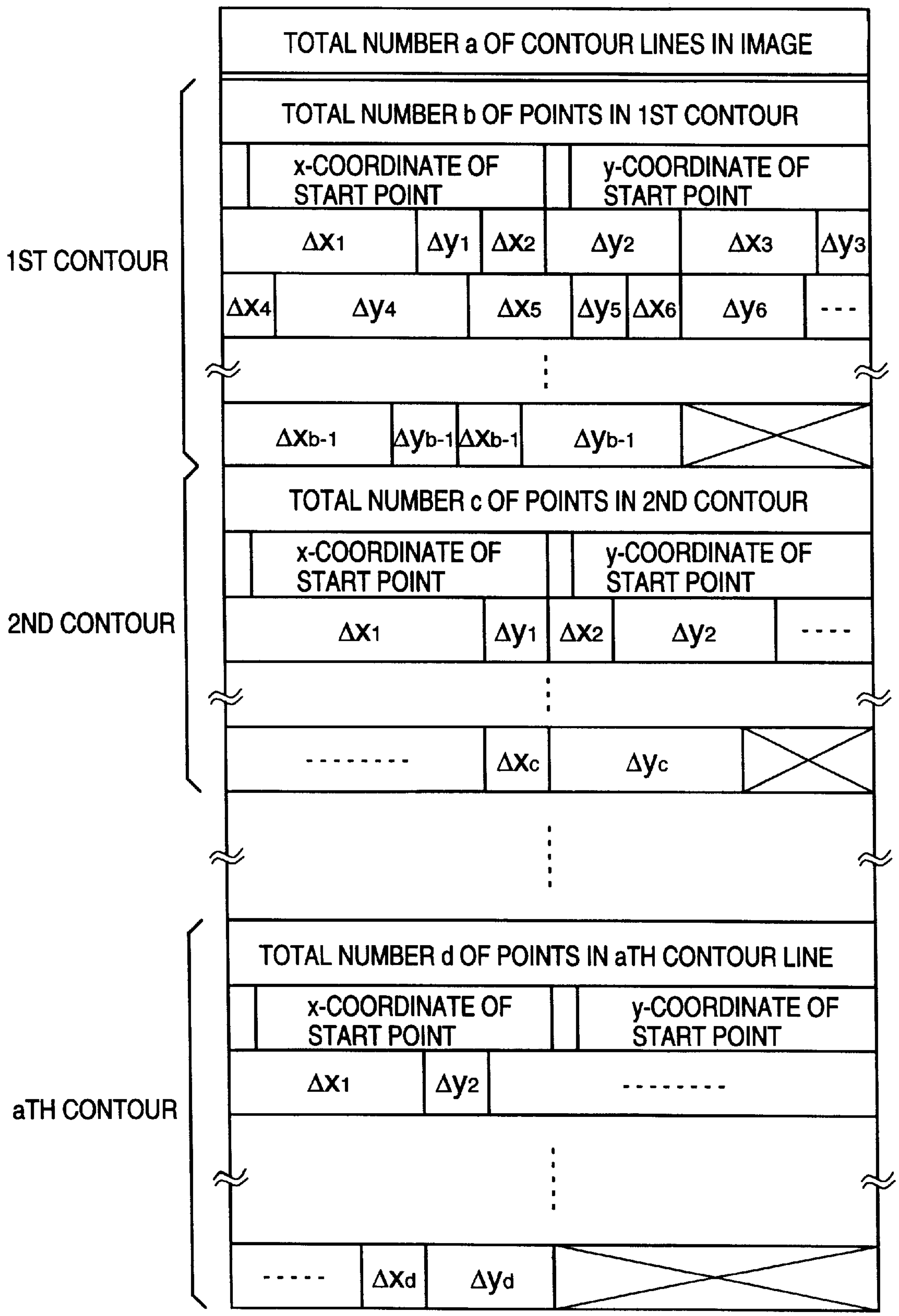
FIG. 20 is a view showing the storage state of a contour vector data table.

In this manner, contour vector data expressed by the coordinate difference values are generated, and these data can be stored as a sequence of coordinate values in units of contours like in the data table shown in FIG. 15. In this table, the start point of each contour is expressed by a normal coordinate value, and points after the start point are expressed by the coordinate difference values. FIG. 20 shows the storage state of a contour vector data table. In FIG. 20, Δx1 and Δy1 are difference value data as variable-length data.

Figure 21:
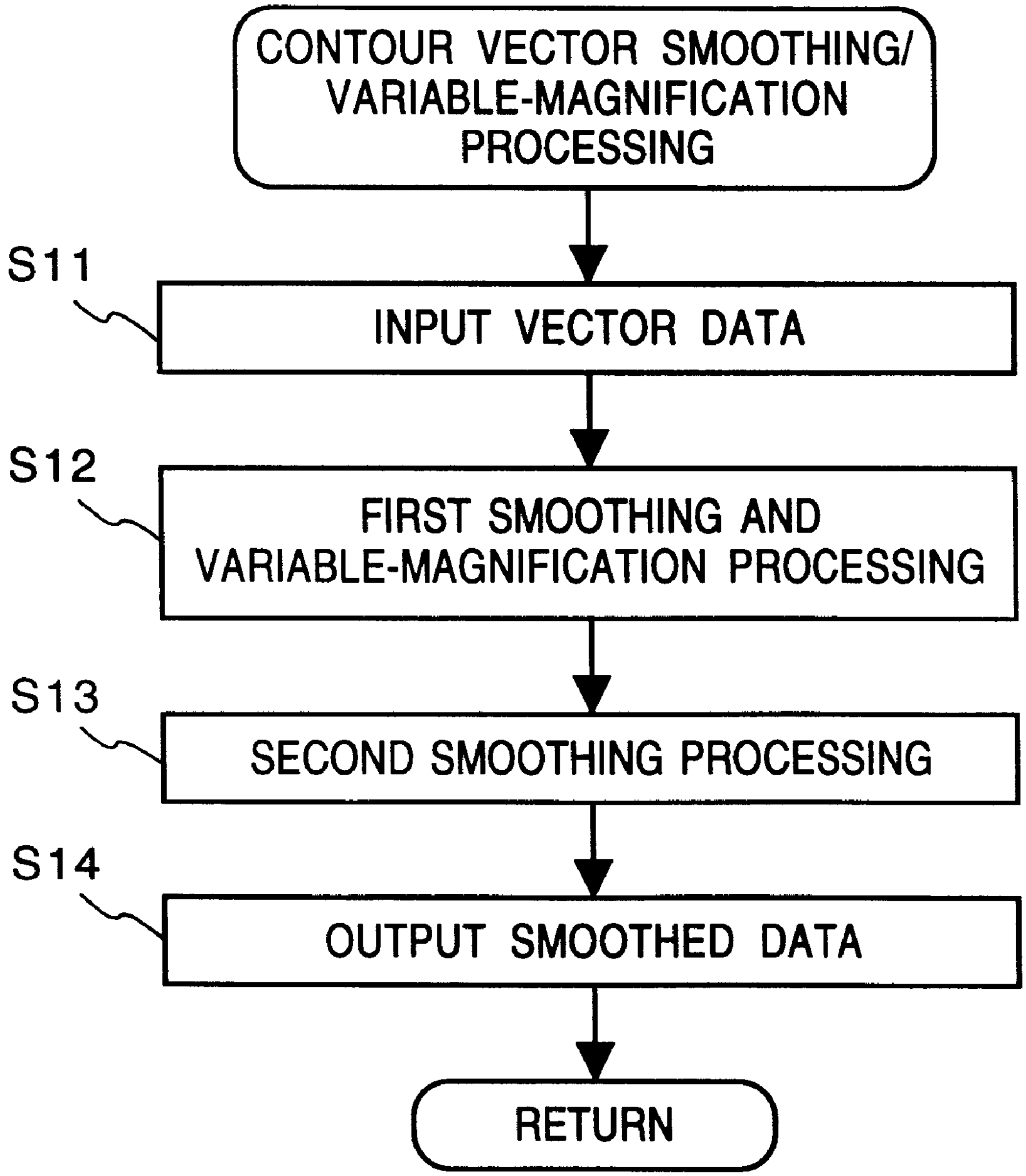
FIG. 21 is a flow chart showing the sequence of the contour vector smoothing/variable-magnification processing.

The processing of the contour vector smoothing/variable-magnification processing unit 13 can be realized by executing the sequence shown in FIG. 21 by the CPU 21 in the arrangement shown in FIG. 2. FIG. 21 shows the processing sequence in the contour vector smoothing/variable-magnification processing unit 13.

In step S11, vector data output from the contour vector extraction unit 12 are received as input data. In step S12, vectors are classified in units of vectors on the basis of combinations of the directions and lengths of each vector of interest and vectors before and after the vector of interest, and contour points after first smoothing processing are defined for the vector of interest in correspondence with patterns. The contour points are contour points corresponding to corners, and consist of corner points which are not smoothed in the next second smoothing processing and other representative points. The following three patterns are used in the first smoothing processing:

① removal of noise in original image

② preservation of sharp corners

③ smoothing of slow oblique lines

Image enlargement/reduction processing is performed together with these processing operations.

Figure 22:
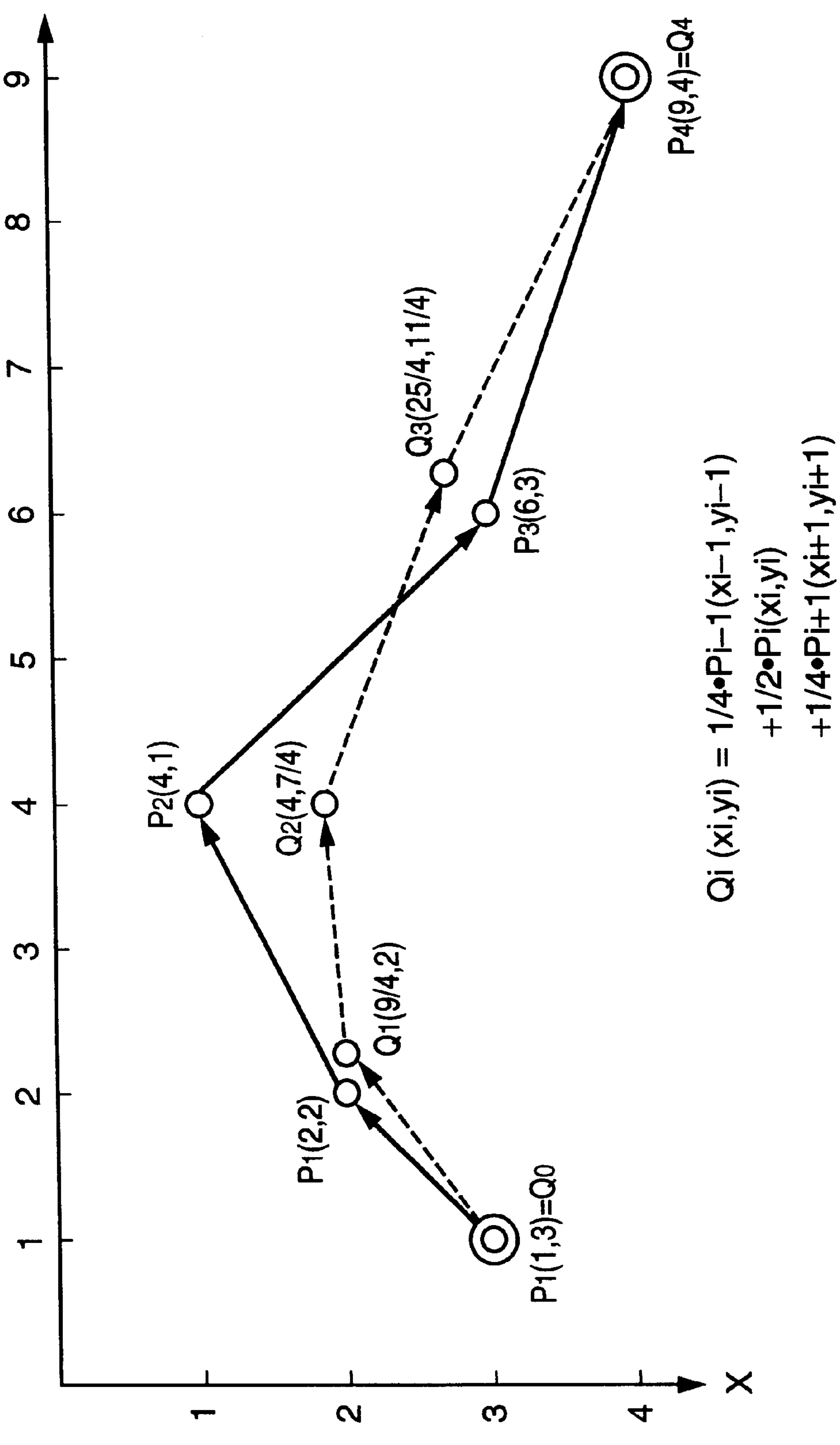
FIG. 22 is a view showing an example of second smoothing processing.

In step S13, a weighted mean is calculated based on the coordinate values of a point of interest and points before and after the point of interest in units of representative points excluding corner points on each contour loop, and the calculated coordinate value is defined as a contour point after the second smoothing processing of the point of interest. For corner points, the coordinate values of the corner points themselves are used as contour point coordinate values after the second smoothing processing. As weighting coefficients used in the calculation of the weighted mean, ¼ is used for points before and after the point of interest, and ½ is used for the point of interest. FIG. 22 shows an example of the second smoothing processing. Referring to FIG. 22, the coordinate values of a contour before smoothing are represented by Pi. A point Qi given by an equation below is calculated for the x- and y-coordinate components of each point Pi, and a contour constituted by the calculated points corresponds to a contour line after the second smoothing processing:

$$Qi=\tfrac{1}{4}Pi-1+\tfrac{1}{2}Pi+\tfrac{1}{4}Pi+1$$

In step S14, smoothed vector data are output, thus ending the smoothing/variable-magnification processing.

The binary image reproduction unit 15 outputs, in the raster-scanning format, a binary image generated by painting a region surrounded by a vector figure expressed by contour data which have been subjected to the second smoothing processing and are transferred via, e.g., an I/O. The output raster-scanning format data is visualized by the binary image output unit 17 such as a video printer.

Figure 23:
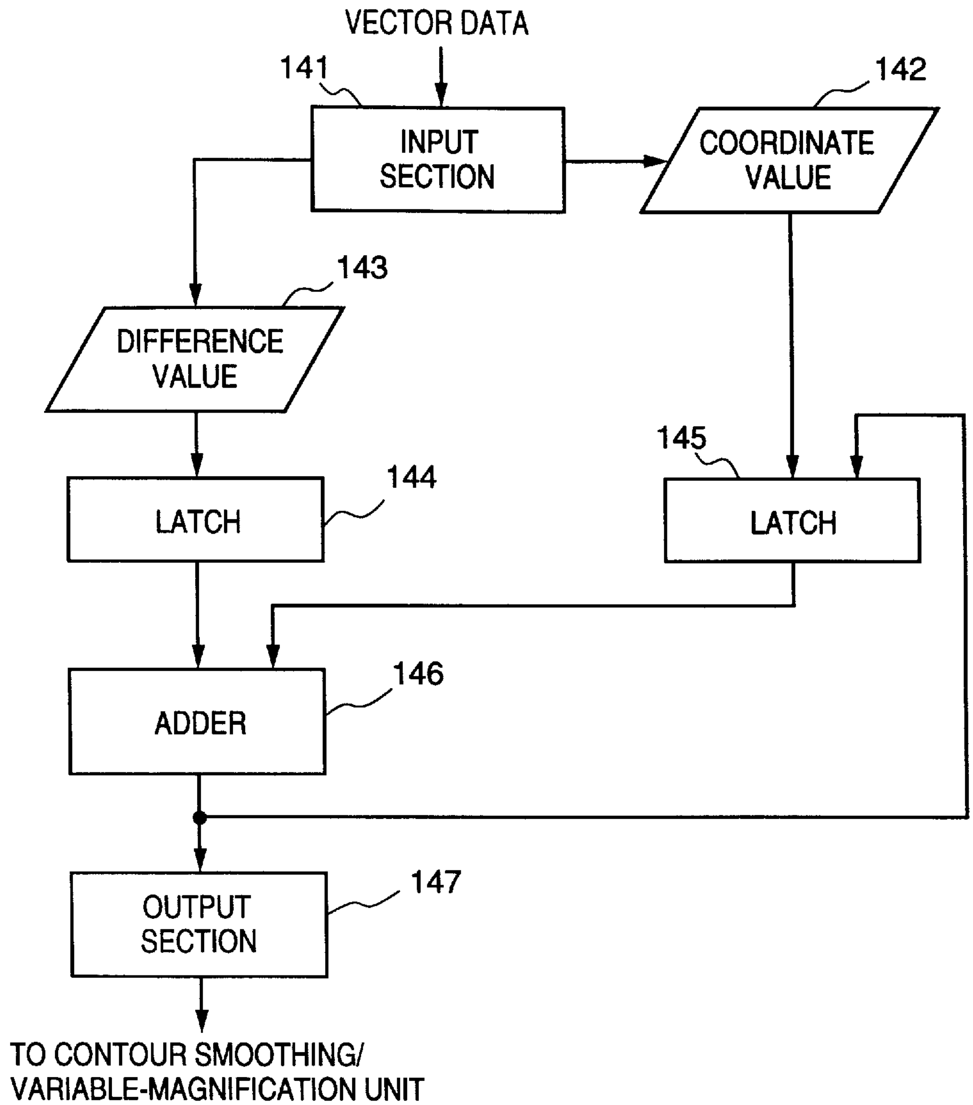
FIG. 23 is a block diagram showing the control arrangement of a processing unit for restoring a normal coordinate expression from an expression based on the coordinate difference values.

The contour vector smoothing/variable-magnification processing unit 13 executes processing for sequentially calculating required coordinate values on the basis of the contour start point coordinate values and the coordinate difference values of outline vectors obtained from the contour vector extraction unit 12 to restore a normal coordinate expression, and then, executes the smoothing/variable-magnification processing. FIG. 23 is a block diagram showing the control arrangement of the processing portion for restoring an expression based on coordinate difference values to a normal coordinate expression.

The output from the contour vector extraction unit 12 is input to an input section 141, and a contour start point coordinate value 142 and a coordinate difference value 143 are respectively held by latches 145 and 144. The values held by the latches 145 and 144 are added to each other by an adder 146 to output a coordinate value, and the value held by the latch 145 is also updated to a value obtained by the adder 146. In this case, if "0" is used as an initial value of the difference value 143, the coordinate value 142 is directly output as the start point. The output coordinate value is input to the contour vector smoothing/variable-magnification processing unit 13. Of course, this processing may also be realized by executing a control program stored in the ROM 22 by the CPU 21 in the arrangement shown in FIG. 2.

Figure 24:
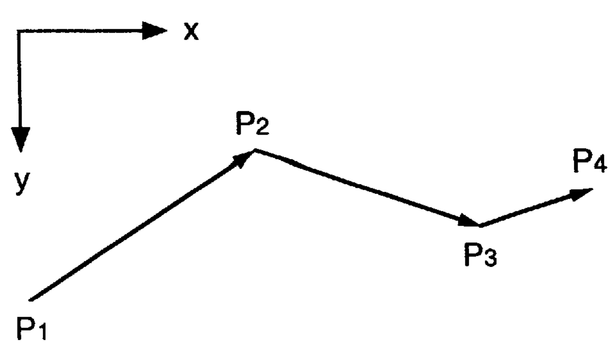
FIG. 24 is a view showing some contour vectors.

The binary image reproduction unit 15 converts an image obtained by painting a portion on one side of a contour line defined by outline vectors into raster-scanning format data. For this purpose, three vectors, i.e., a vector of interest and vectors before and after the vector of interest are required. FIG. 24 shows some vectors constituting an outline. As can be seen from FIG. 24, since the binary image reproduction unit 15 using three successive vectors requires four coordinate values of points P1 to P4, the binary image reproduction unit 15 operates using registers (not shown) for holding the four coordinate values. These four registers are used while erasing the oldest coordinate value each time processing for a vector of interest is completed, and at the same time, storing the sequentially input latest coordinate value to update the vector of interest. The processing of the binary image reproduction unit 15 may be realized in a known sequence.

Variable-magnification Processing of Isolated Point

Figure 3:
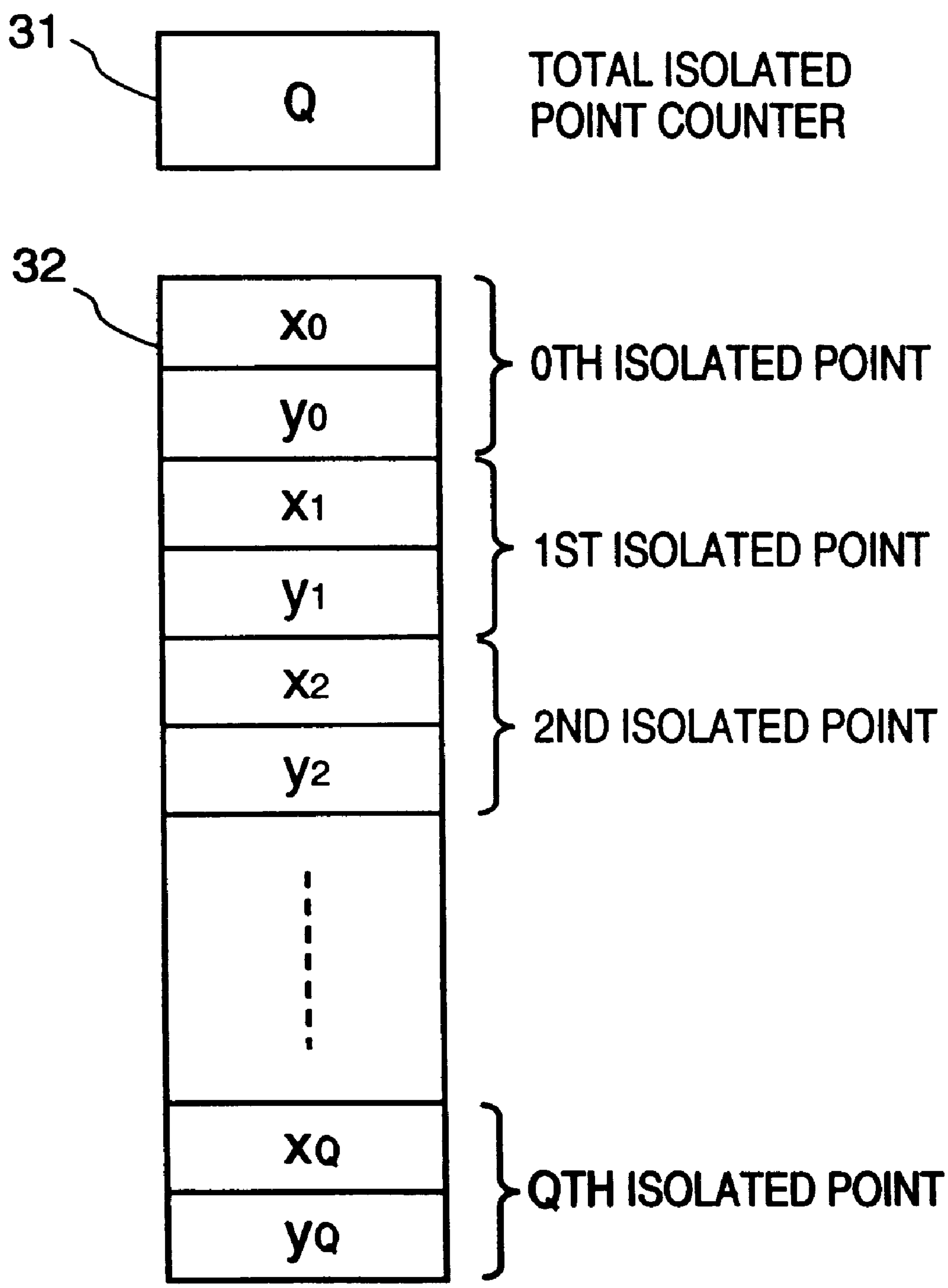
FIG. 3 is a table for storing isolated point data.
Figure 4:
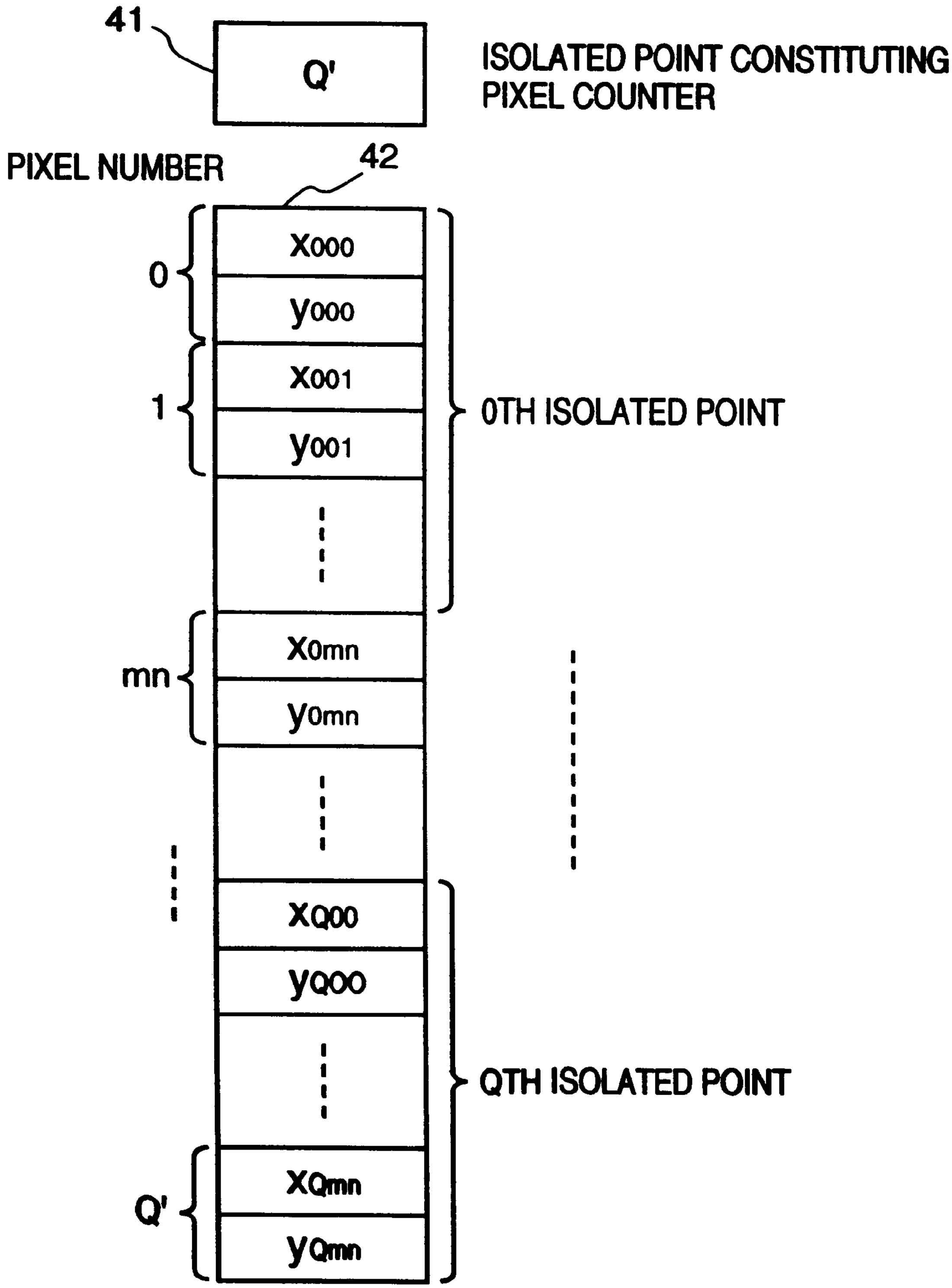
FIG. 4 is a table for storing black pixel position data constituting enlarged/reduced isolated points.

The contour vector data and isolated point data obtained as a result of the processing by the contour vector extraction unit 12 are stored in the RAM 24, and the isolated point data are stored in the data format shown in FIG. 3, as described above. A counter 31 stores the total number Q of isolated points of an input binary image, and a table 32 stores a sequence of x- and y-coordinates of the positions of isolated points. Also, the RAM 24 stores the size (the number X of main scanning pixels, and the number Y of sub-scanning pixels) of the input image, and the variable-magnification factor (the main scanning variable-magnification factor M and the sub-scanning variable-magnification factor N). The variable-magnification processing results of isolated points are also temporarily stored in the RAM 24 in the format shown in FIG. 4. Since a counter 41 stores the number Q' of pixels of isolated points after variable-magnification processing, it is initially set to be "0". A table 42 stores a sequence of x- and y-coordinates of the positions of pixels constituting the isolated points.

Figure 5:
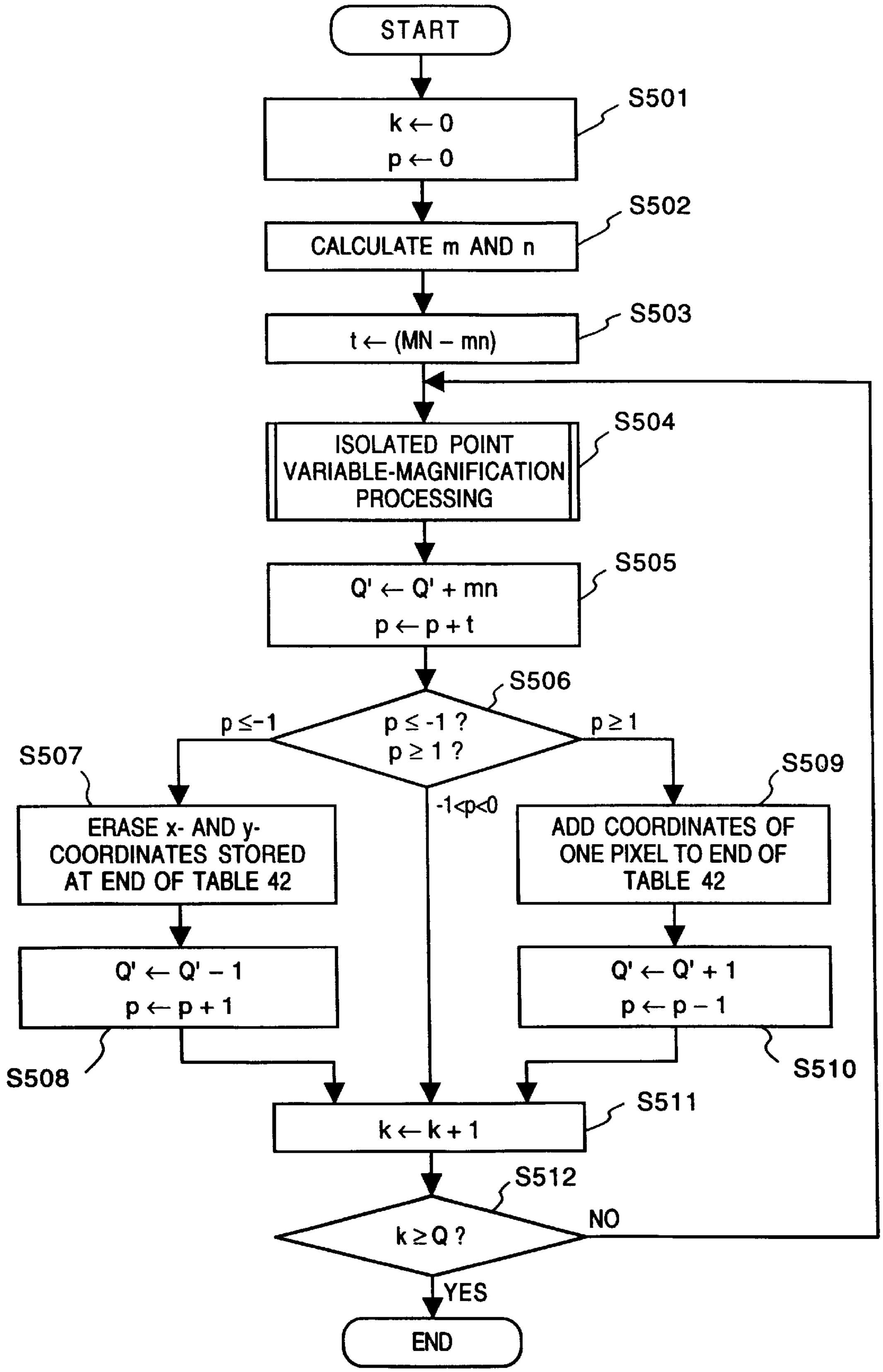
FIG. 5 is a flow chart showing the isolated point variable-magnification processing.

FIG. 5 is a flow chart showing the flow of the processing of the isolated point variable-magnification processing unit 14 shown in FIG. 1. This flow chart can be realized when the CPU 21 shown in FIG. 2 executes a program stored in the ROM 22.

In step S501, a counter k and a temporary buffer p are respectively set to be "0". In step S502, integer magnification factors (the main scanning variable-magnification factor m and the sub-scanning variable-magnification factor n) are calculated. The factors m and n are obtained by rounding the first digits below the decimal point of the main scanning variable-magnification factor M and the sub-scanning variable-magnification factor N. In step S503, a value (MN−mn) is set in a variable t. In this case, t may assume a negative value. Note that k, p, m, n, and t are variables assured on buffers in the RAM 24. In step S504, the x- and y-coordinate values of pixel positions which become black pixels upon variable-magnification and re-disposition of a k-th isolated point in the table 32 are stored in the table 42.

Figure 6:
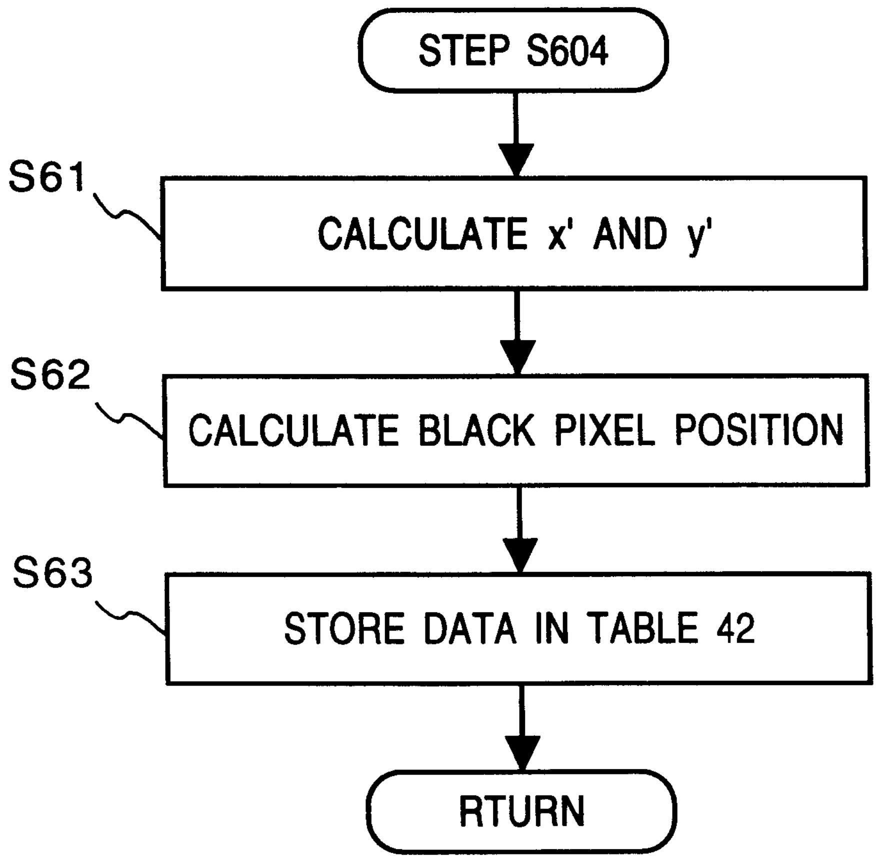
FIG. 6 is a flow chart showing the processing contents in step S504.
Figure 7:
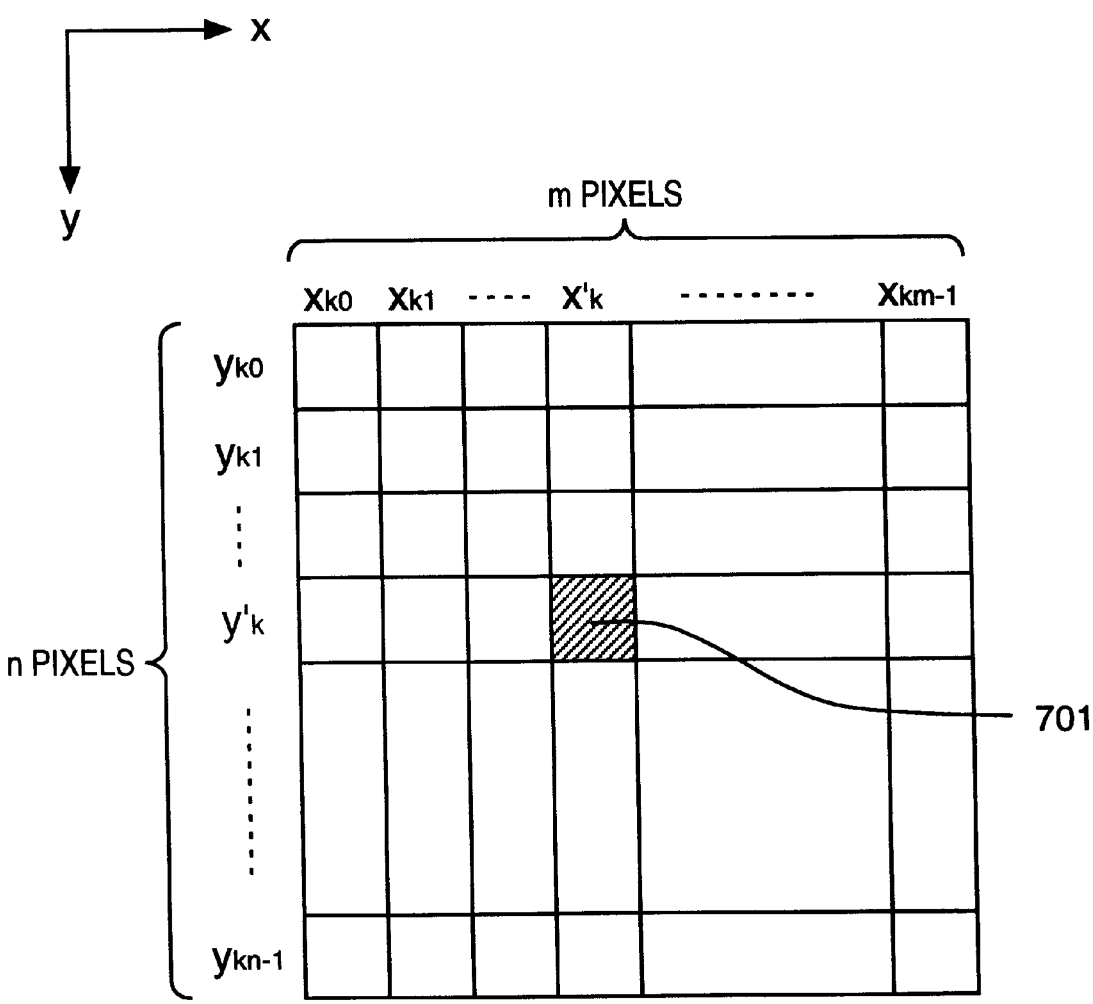
FIG. 7 is an explanatory view of the isolated point variable-magnification processing.

FIG. 6 is a flow chart showing the processing contents in step S504. In step S61, a re-disposition position (x', y') of an isolated point is calculated. More specifically, if the coordinates of the k-th isolated point in the table 32 are xk and yk, x'=mxk and y'=nyk are calculated. In step S62, the pixel positions which become black pixels when an enlarged/reduced isolated point is re-disposed at the calculated position are calculated. Since the size of the enlarged/reduced isolated point is m pixels (in the horizontal direction) x n pixels (in the vertical direction), the isolated point is re-disposed so that the position of a central pixel 701 is (x'k, y'k), as shown in FIG. 7. Finally, the pixel positions calculated in step S62, i.e., (xk0, yk0), . . . , (xkm−1, yk0), . . . , (ykm−1, ykn−1) in FIG. 7 are stored in the order named in a non-used area of the table 42 in step S63.

Upon completion of this processing, the flow advances to step S505 in FIG. 5. In step S505, a value mn is added to a value Q' of the counter 41, and a value t is added to the temporary buffer p. In step S506, it is checked if the value p is smaller than −1 or larger than 1. If p is smaller than −1, the flow advances to step S507, and the x- and y-coordinates stored at the end of the table 42 are erased. In step S508, 1 is subtracted from the value of the counter 41, and 1 is added to the value p. On the other hand, if it is determined in step S506 that the value p is larger than 1, the flow advances to step S509. In step S509, the coordinates of a right-neighboring pixel of the coordinates stored at the end of the table 42 are additionally stored in a non-used area in the table 42. In step S510, 1 is added to the value N' of the counter 41, and 1 is subtracted from the value p. In step S511, 1 is added to the value k. Thereafter, it is checked in step S512 if the value k has reached the value Q of the counter 31. If the value k has reached the value Q, the flow ends; otherwise, the flow returns to step S504.

In step S506 in FIG. 5, one pixel is added or subtracted when the accumulated value of the absolute values of the difference between the variable-magnification factor MN and the variable-magnification factor mn of isolated points exceeds 1, thus adjusting the number of pixels of the isolated point as a whole in correspondence with the variable-magnification factor N.

Figure 8:
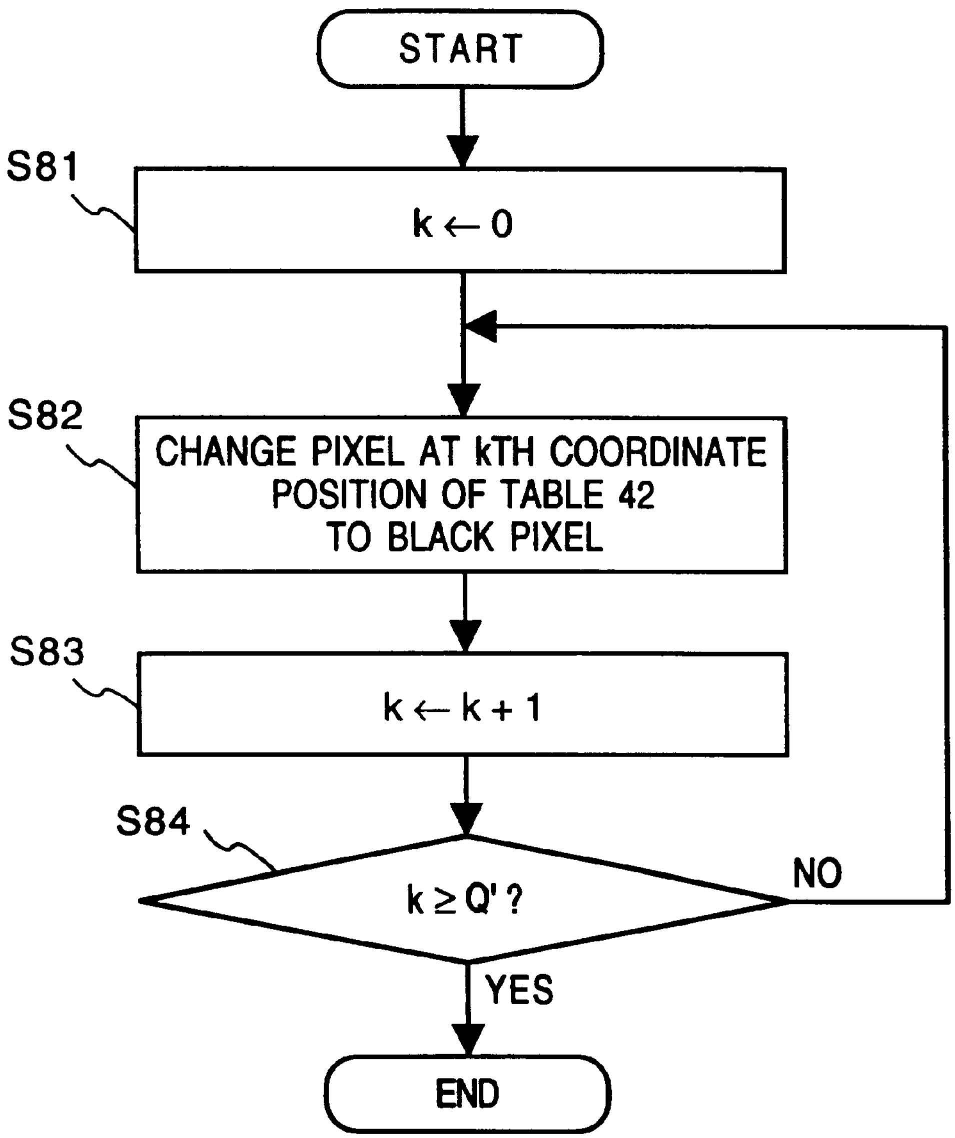
FIG. 8 is a flow chart showing the re-disposition processing of enlarged/reduced isolated points.

FIG. 8 is a flow chart showing the flow of the processing of the isolated point re-disposition processing unit 16. In this processing, isolated point data after the variable-magnification processing obtained in the sequence shown in FIG. 5 are re-disposed on a binary image which corresponds to a portion other than the isolated points and has already been reproduced in the raster-scanning format by the binary image reproduction unit 15. The reproduced binary image is stored in the RAM 24, and the RAM 24 is accessed upon re-disposition of the isolated points.

In step S81, the counter k is set to be 0. In step S82, a black pixel is disposed at the k-th coordinate position stored in the table 42. In step S83, 1 is added to the value of the counter k. If it is determined in step S84 that the value k has reached the value Q' of the counter 41, the flow ends; otherwise, the flow returns to step S82.

The obtained raster image is output from the binary image output unit 17 such as a display, printer, or the like.

As described above, since the isolated point variable-magnification processing unit 14 and the isolated point re-disposition processing unit 16 are arranged in the image variable-magnification processing apparatus, isolated points included in a binary image such as a pseudo halftone image are processed as the coordinates of points, thus saving the storage capacity required for storing contour vectors. In addition, when variable-magnification processing of an image expressed by contour vectors is to be performed even at a variable-magnification factor which is not an integer multiple, variable-magnification processing of isolated points can be performed to reproduce the black pixel density of an input image in correspondence with the variable-magnification factor.

Second Embodiment

Figure 9:
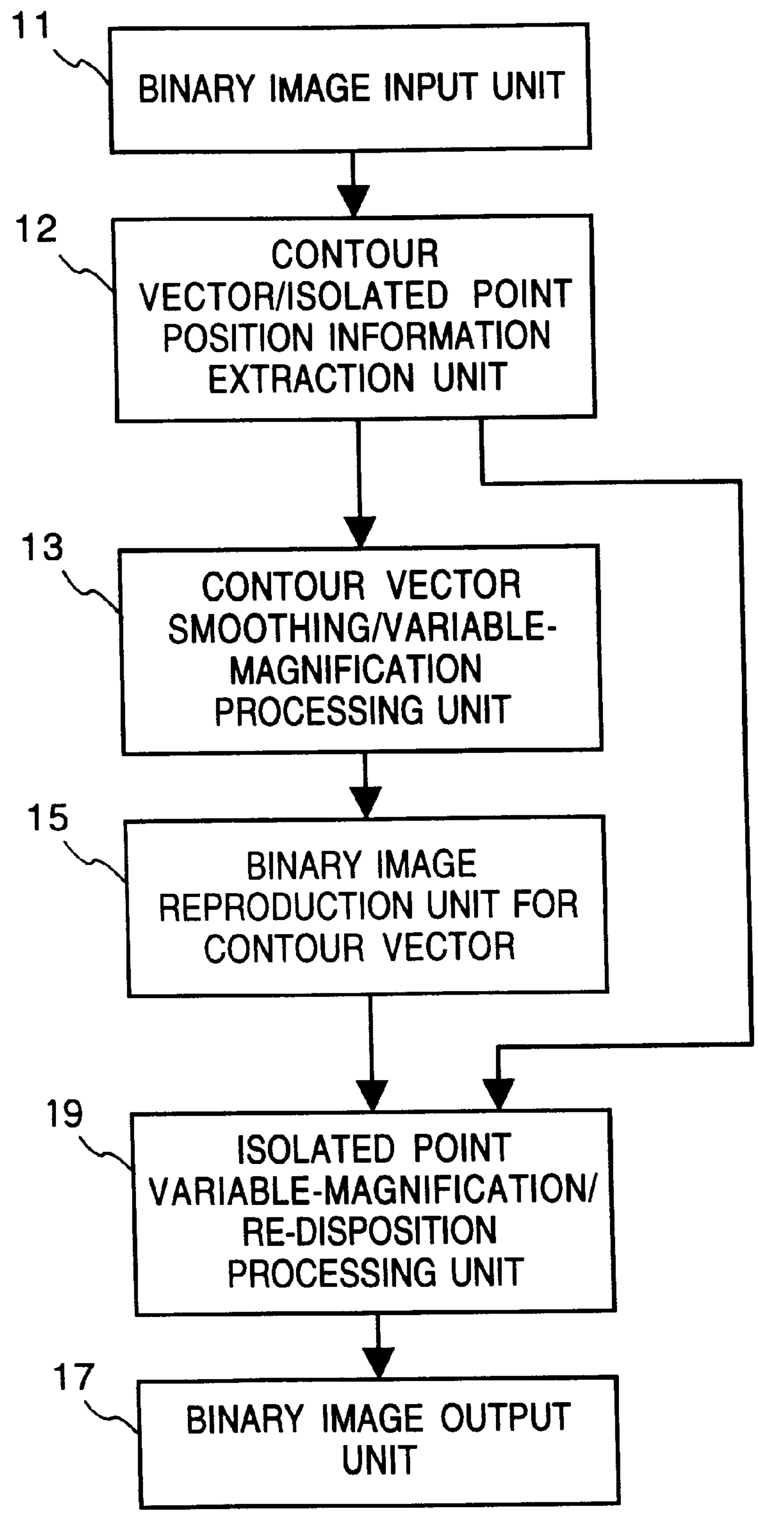
FIG. 9 is a block diagram showing the flow of image variable-magnification processing in the second embodiment.

In the first embodiment, the isolated point variable-magnification processing unit 14 shown in FIG. 1 temporarily stores isolated point data after variable-magnification processing in the table on the RAM 24, and the isolated point re-disposition processing unit 16 re-disposes isolated points on a binary image. However, as shown in FIG. 9, after a portion other than isolated points is reproduced to a binary image, an isolated point variable-magnification/re-disposition processing unit 19 may directly dispose isolated points while executing variable-magnification processing of the isolated points. In this case as well, the unit 19 accesses a reproduced binary image stored in the RAM 24.

Figure 10:
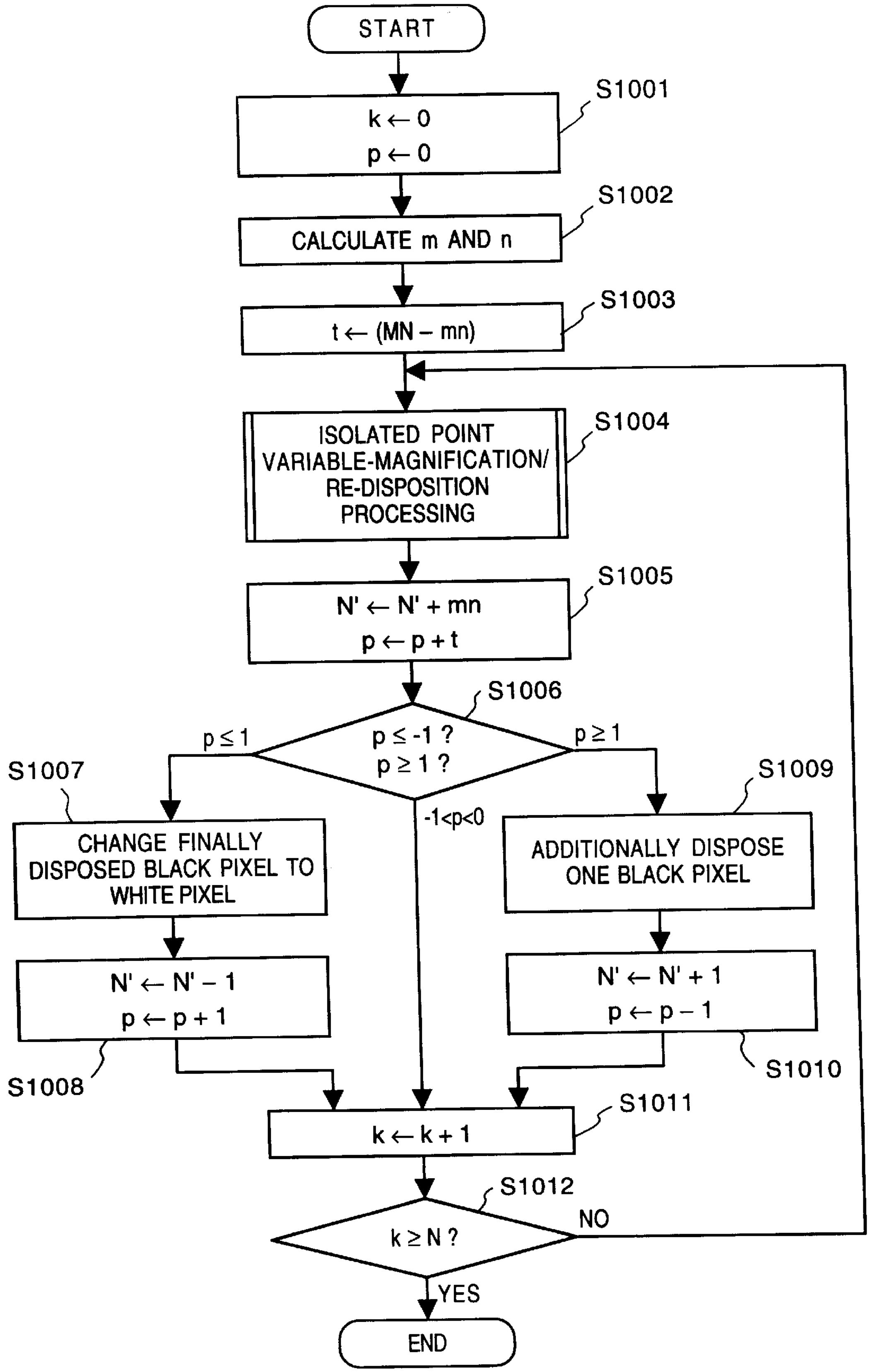
FIG. 10 is a flow chart showing the isolated point variable-magnification processing in the second embodiment.
Figure 11:
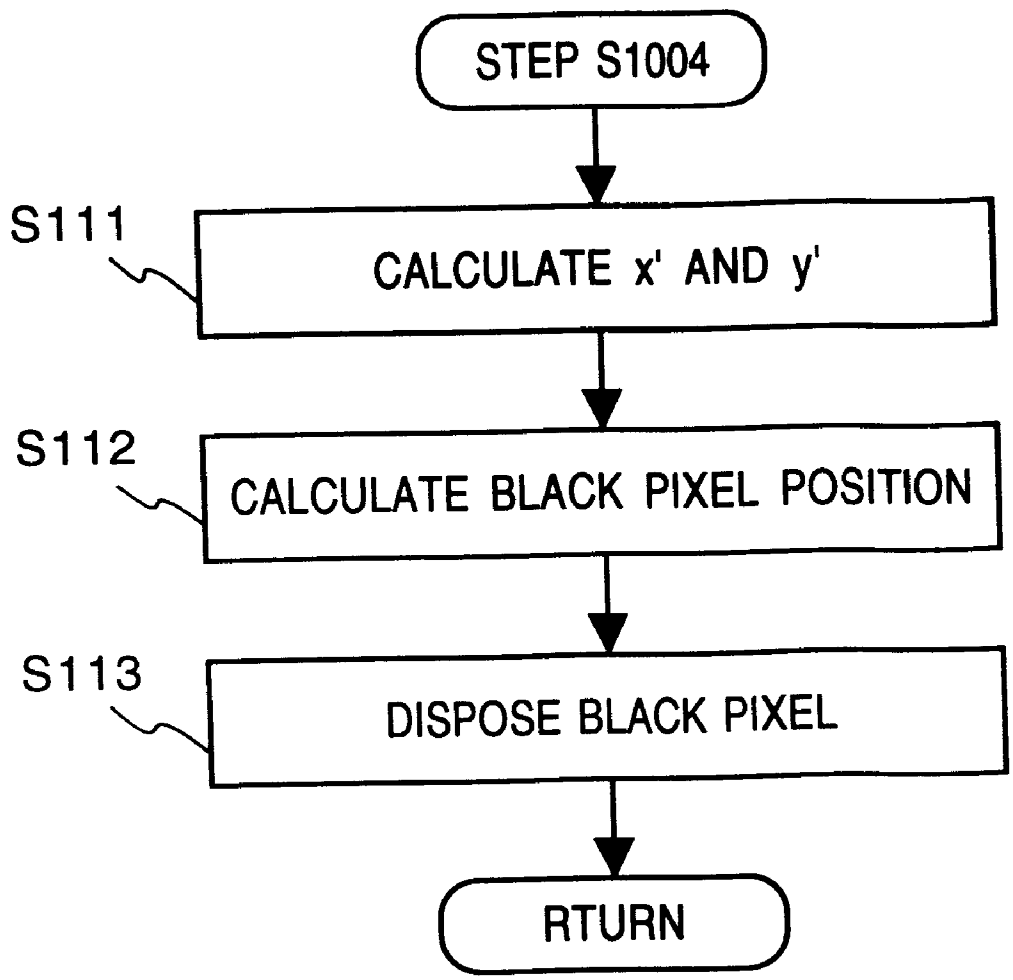
FIG. 11 is a flow chart showing the processing contents in step S1004.

FIG. 10 is a flow chart showing the operation of the isolated point variable-magnification/re-disposition processing unit 19. The processing sequence in FIG. 10 corresponds to FIG. 5, and in steps S1004 and S1009, black pixels are directly disposed at the pixel positions on an image without storing the coordinate data in the table unlike in the first embodiment. FIG. 11 is a flow chart showing the processing contents in step S1004. In step S1007, the temporarily disposed black pixel is changed to a white pixel. As described above, in this embodiment, an image is directly processed without operating addresses on the table.

With this arrangement, the same effect as in the first embodiment can be expected, and since an image is directly processed without using any table, the image processing speed can be improved, and quick variable-magnification processing can be realized.

Third Embodiment

The present invention is not limited to the processing in steps S507 and S509 in FIG. 5 in the first embodiment. For example, the processing for erasing the x- and y-coordinates stored at the end of the table 42 in step S507 may erase the x- and y-coordinates of any of the last to mn-th pixels. The coordinates to be erased may be cyclically determined based on an appropriate rule or may be determined randomly. In step S509, the coordinates of a right-neighboring pixel of the coordinates stored at the end of the table 42 are added to a non-used area of the table 42. However, the coordinates of a pixel position to be added are not particularly limited as long as the position neighbors an enlarged/reduced isolated point. The position, where a pixel to be added is disposed, around an enlarged/reduced isolated point may be cyclically determined based on an appropriate rule or may be determined randomly.

Fourth Embodiment

The present invention is not limited to the way of performing the variable-magnification processing of an isolated point, shown in FIG. 7. For example, a position (xk0, yk0) may be set at the position of a central pixel 701 shown in FIG. 7, or a position (xkm−1, ykn−1) may be set at the position of the pixel 701 shown in FIG. 7.

Fifth Embodiment

In place of disposing isolated points by accessing a reproduced binary image stored in the RAM 24 unlike in the arrangement shown in FIGS. 1 and 9, an image to be finally output may be obtained as follows.

That is, two image memories are prepared in the RAM 24, and a binary image on which isolated points are re-disposed is generated on one memory. A binary image which has already been stored in the other memory is synthesized with the binary image on which the isolated points are re-disposed, thus obtaining a desired binary image.

The present invention may be applied to either a system constituted by a plurality of devices or an apparatus consisting of a single device. Also, the present invention may be applied to a case wherein the invention is achieved by supplying a program to the system or apparatus, as a matter of course.

As described above, according to the first to fifth embodiments, the storage capacity required for storing contour vector data of an image can be reduced, and when an image is output by enlarging/reducing stored contour vectors, an input image can be accurately reproduced.

Sixth Embodiment

In the first to fifth embodiments, upon execution of variable-magnification processing of an image, variable-magnification processing of isolated points in a halftone image region is separately performed. In the sixth embodiment and subsequent embodiments, a character/line image region and a halftone image region are discriminated, and different variable-magnification processing operations are performed for these regions.

Figure 25:
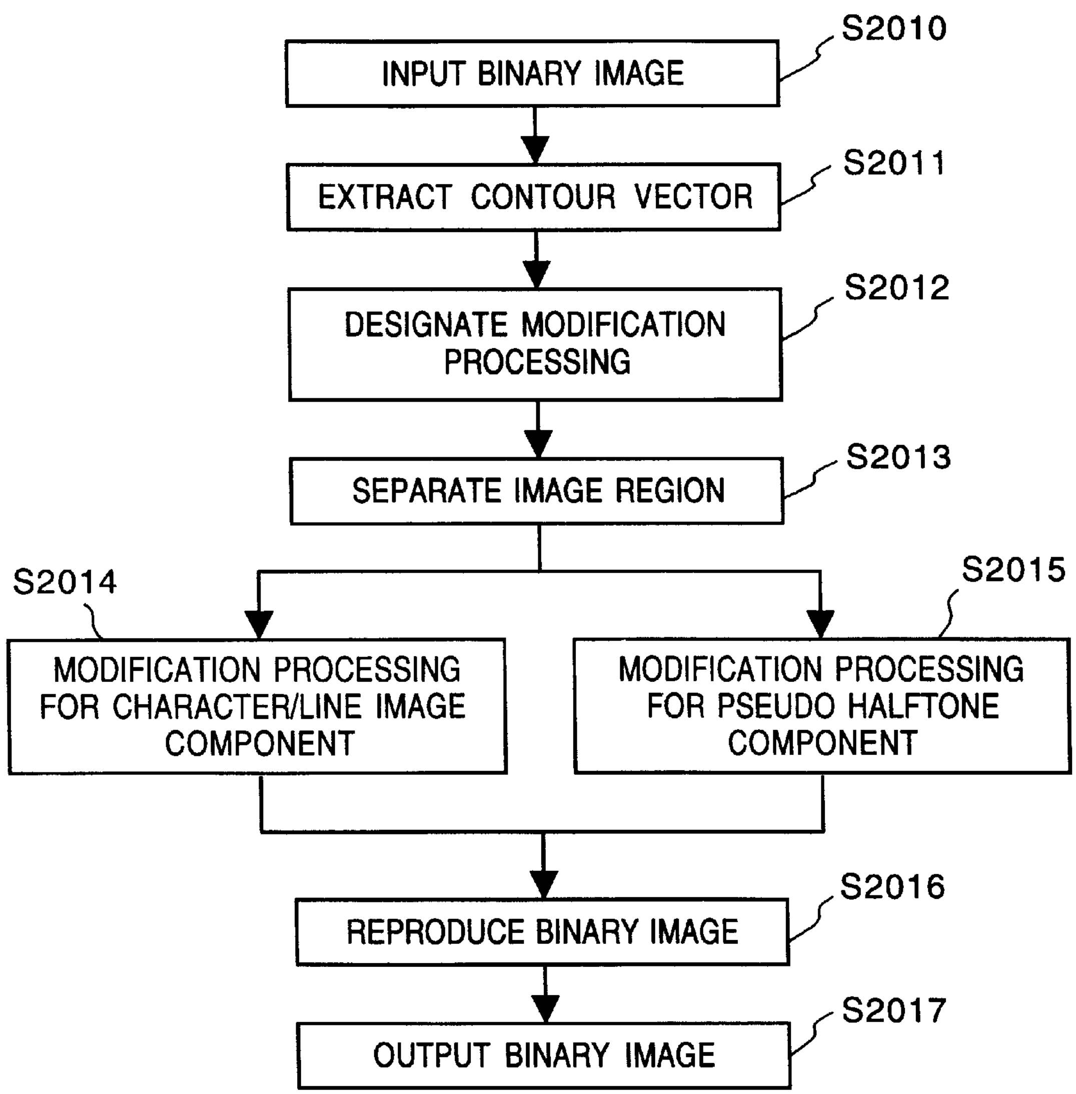
FIG. 25 is a block diagram showing the flow of processing in the sixth embodiment.

FIG. 25 shows the flow of processing in an image processing apparatus of the sixth embodiment. In FIG. 25, step S2010 is the binary image input step, and in this step, a digital binary image to be subjected to modification processing is input in the raster-scanning format. Step S2011 is the contour vector extraction step, and in this step, contour vectors are extracted from the binary image signal in the raster-scanning format. Step S2012 is the modification processing designation step, and in this step, modification processing modes to be executed for character/line image components and pseudo halftone components in the input image are designated. Step S2013 is the image region separation step of separating the contour vectors extracted in step S2011 to character/line image components and pseudo halftone components. In this step, of the separated contour vectors, the vectors of the character/line image components are subjected to the modification processing designated in step S2012 in the modification processing step as step S2014, and the vectors of the pseudo halftone components are subjected to the modification processing designated in step S2012 in the modification processing step as step S2015. Step S2016 is the binary image reproduction step, and in this step, a binary image is reproduced as data in the raster-scanning format on the basis of the contour vectors of the two different types of components processed in steps S2014 and S2015. Step S2017 is the final variable-magnification processing result output step. In this step, the raster-scanning format data of the binary image subjected to the variable-magnification processing is output to a display, paper sheet, communication path, or the like.

Figure 26:
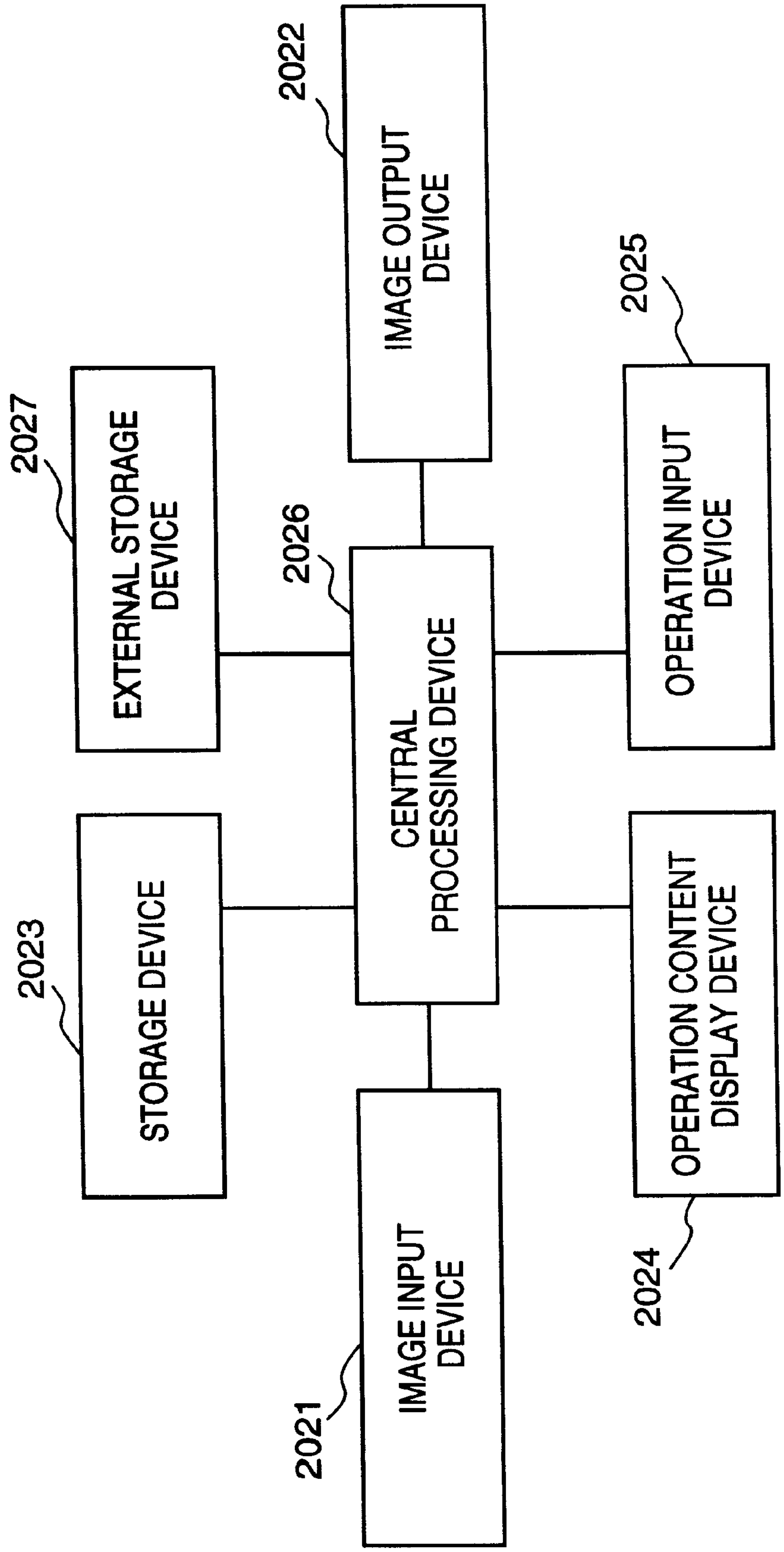
FIG. 26 is a block diagram showing the hardware arrangement of the sixth embodiment.

FIG. 26 is a block diagram showing the hardware arrangement of the image processing apparatus of the sixth embodiment.

In FIG. 26, reference numeral 2021 denotes an image input device such as a scanner; 2022, an image output device such as a printer, display, or the like; 2023, a storage device (comprising, e.g., a RAM) for storing programs for controlling the entire image processing apparatus, image data, and the like; 2024, an operation content display device such as a display; 2025, an operation input device such as a keyboard, mouse, or the like; and 2026, a central processing device for controlling the entire image processing apparatus. Reference numeral 2027 denotes an external storage device for storing data, programs (corresponding to the flow chart in FIG. 25 and those to be described later), and the like. The device 2027 comprises, e.g., a hard disk device.

A binary image input from the image input device 2021 or stored in the external storage device 2027 is stored in the storage device 2023. The operation content display device 2024 displays an image modification processing instruction input using the operation input device 2025. Upon reception of this instruction, the central processing device 2026 executes the designated processing while accessing the storage device 2023, and outputs the processing result to the image output device 2022 or stores the processing result in the external storage device 2027.

In the sixth embodiment, the contour vector extraction step (the operation in step S2011 in FIG. 25) and the binary image reproduction step (the operation in step S2016 in FIG. 25) use the techniques of the first embodiment described above or the embodiments of Japanese Patent Laid-Open Nos. 4-157578 and 5-40831. These steps will be briefly described below.

In the contour vector extraction step, one pixel is assumed to have a given area. More specifically, one pixel is recognized as a square having unit lengths (e.g., "1") in both the vertical and horizontal directions. As a result, coordinates can be set between adjacent pixels. The contour vector extraction step executes processing for extracting the edges of an image, i.e., vectors extending across the boundaries between black and white pixels. As a result, the directions of vectors are only the vertical and horizontal directions, as can be understood by those who are skilled in the art. Also, as can be understood by those who are skilled in the art, vectors are alternately generated like a vertical vector, horizontal vector, vertical vector, horizontal vector, . . . although their vector lengths vary. Note that the extraction direction of a vector is defined so that a black pixel is always present on the left side in the direction of a vector to be extracted (or vice versa).

The binary image reproduction step is processing for painting a portion inside a contour based on vector data with black pixels when a binary image is reproduced based on vector data.

Figure 27:
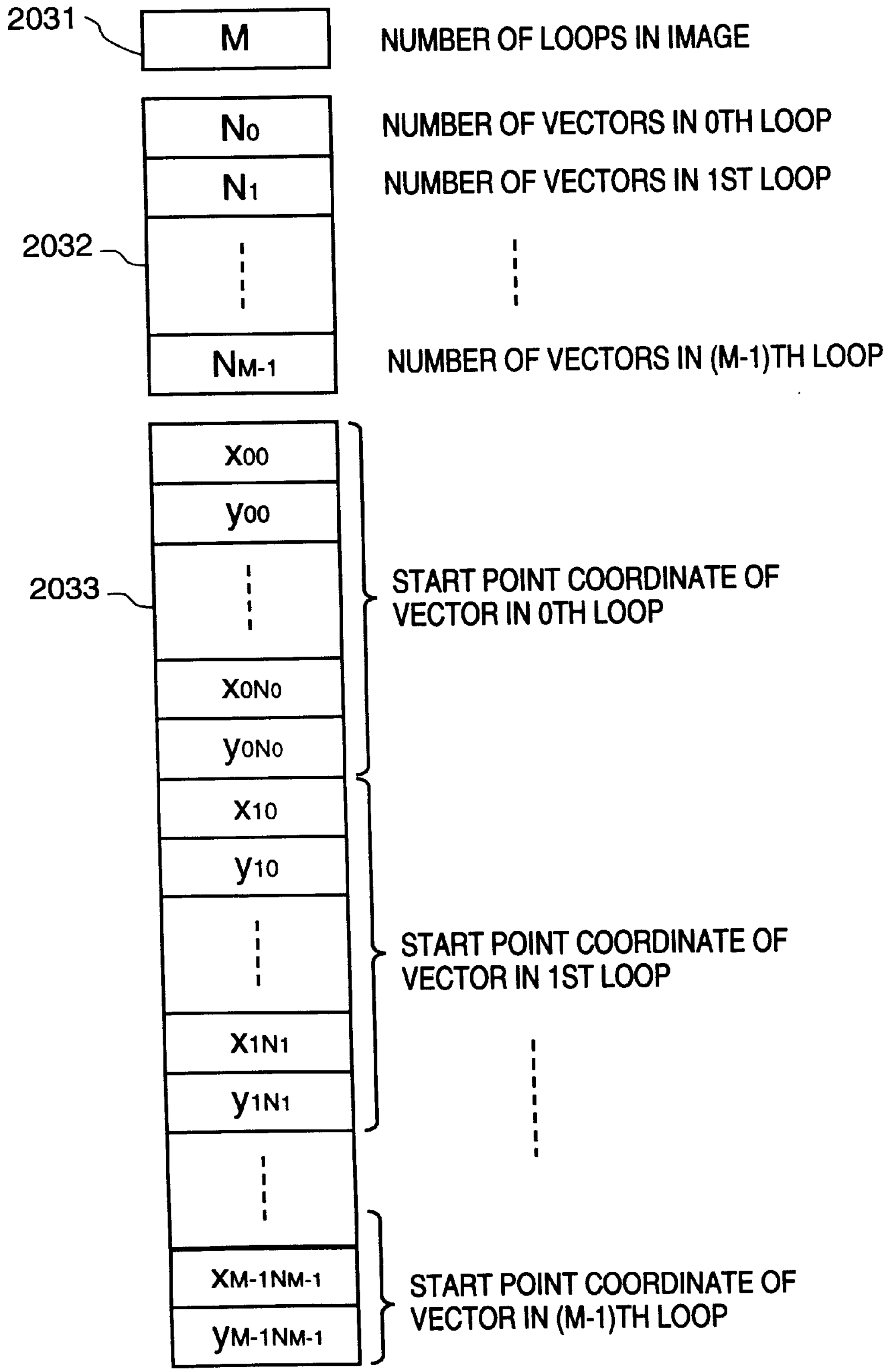
FIG. 27 is a table for storing contour vector data.

In step S2010, a binary image input from the image input device 2021 or stored in the external storage device 2027 is stored in the storage device 2023. In step S2011, coarse contour vectors of the input image are extracted by the above-mentioned processing. The coarse contour vector data are stored in the form of a table in the format shown in FIG. 27 in the storage device 2023. The coarse contour vectors are classified into groups each constituting one closed loop. In FIG. 27, an area 2031 stores the number of closed loops in the input image, and an area 2032 stores the numbers of vectors in loops $N_0, N_1, \ldots, N_{M-1}$. An area 2033 stores the coordinates of the start points of the respective vectors. The storage device 2023 also stores the size (the number X of main scanning pixels and the number Y of sub-scanning pixels) of the input image. Note that a sequence of data are stored in the connection order of vectors constituting a loop, and each loop starts from a horizontal vector (the reason for this will become apparent from the following description).

In step S2012, the modification processing for the input image is designated using the operation input device 2025. The input instruction is supplied to the storage device 2023 as a character string, and processing commands designated by this character string are executed in steps S2014 and S2015. As the modification processing to be executed in steps S2014 and S2015, the same processing may be designated, or different processing operations may be designated, as a matter of course.

Figure 28:
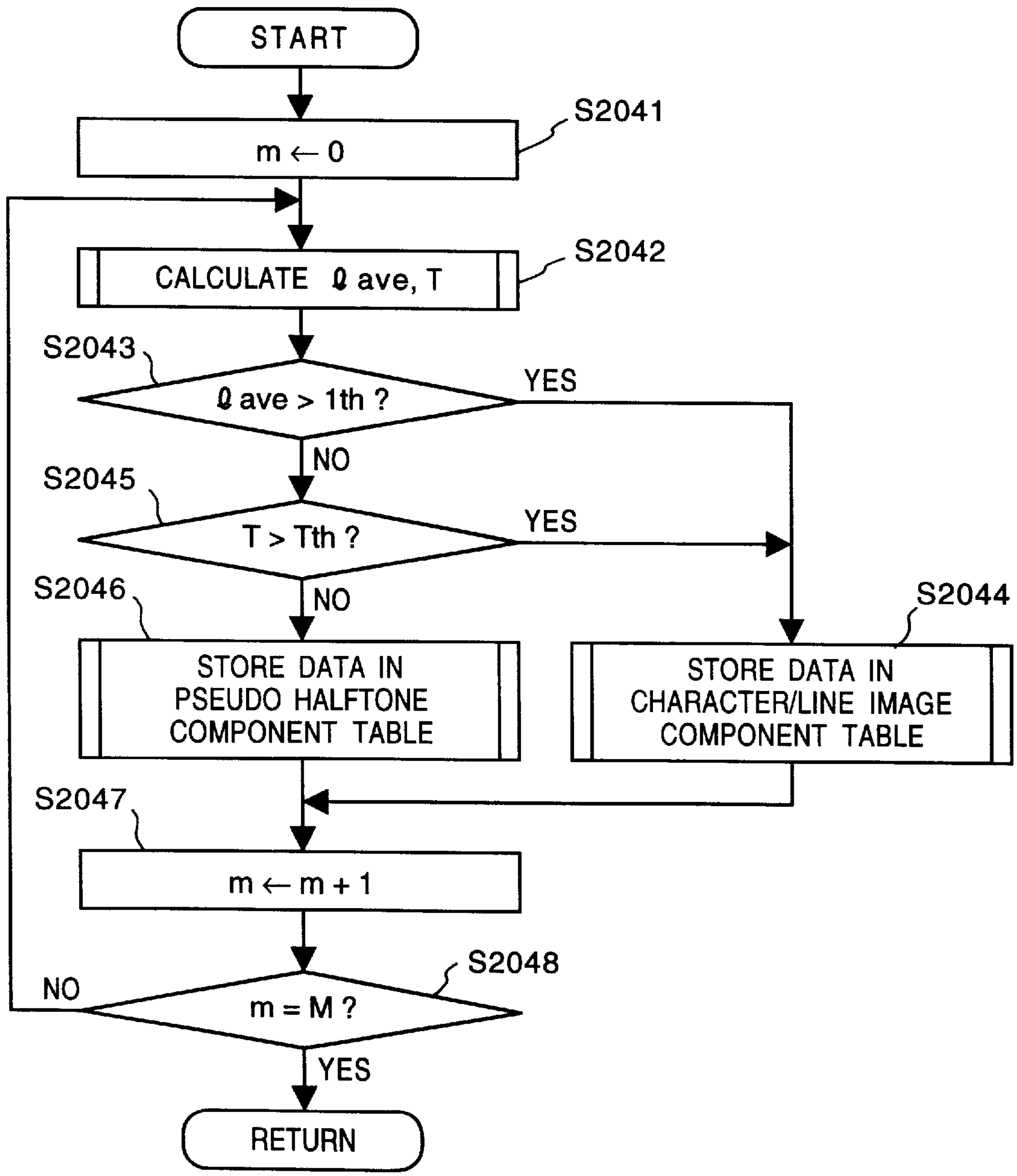
FIG. 28 is a flow chart showing the processing operation in step S2013 in FIG. 25.
Figure 33:
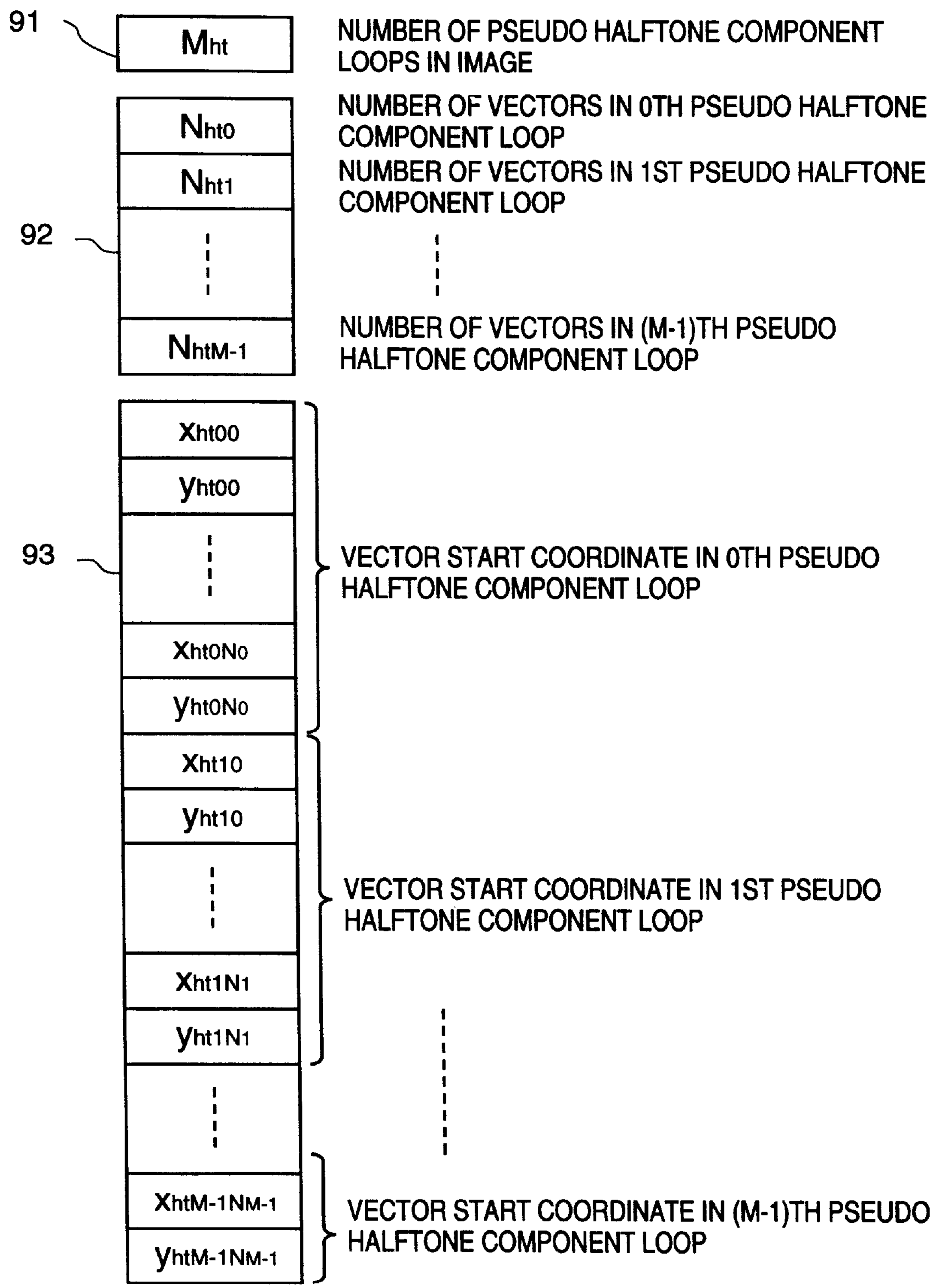
FIG. 33 is a table for storing contour vector data for pseudo halftone image components.

In step S2013, the input binary image is subjected to image-region separation into character/line image components and pseudo halftone components. In this processing, it is discriminated whether each closed loop of the contour vector data shown in FIG. 27 is a loop of character/line image components or that of pseudo halftone components. The processing contents in this step will be explained below with reference to the flow chart. Two tables having the same format as that shown in FIG. 27 are prepared in the storage device 2023 in correspondence with a character/line image component loop (FIG. 31) and a pseudo halftone component loop (FIG. 33). FIG. 28 is a flow chart showing the operation of the image-region separation means.

In step S2041, a counter buffer m in the storage device 2023 is set to be "0" as an initial value. In step S2042, feature amounts lave and T (to be described later) required for image-region separation are extracted from contour vector data of the m-th loop stored in the table shown in FIG. 27.

If it is determined in step S2043 that save is larger than a threshold value lth, it is determined that the m-th loop is a character/line image component loop, and contour vector data of this loop are stored in the character/line image component table in the storage device 2023 in step S2044. On the other hand, if it is determined in step S2043 that lave is smaller than the threshold value lth, the flow advances to step S2045. If it is determined in step S2045 that T is larger than a threshold value Tth, it is determined that the m-th loop is a character/line image component loop, and contour vector data of this loop are stored in the character/line image component table in the storage device 2023 in step S2044.

If lave is smaller than lth and T is smaller than the threshold value Tth, it is determined that the m-th loop is a pseudo halftone component loop, and contour vector data of this loop are stored in the pseudo halftone component table in the storage device 2023 in step S2046.

In step S2047, 1 is added to the value of the counter m. If it is determined in step S2048 that the value m has reached the total number M of loops, this image-region separation processing ends; otherwise, the flow returns to step S2042 to discriminate the next loop.

Figure 29:
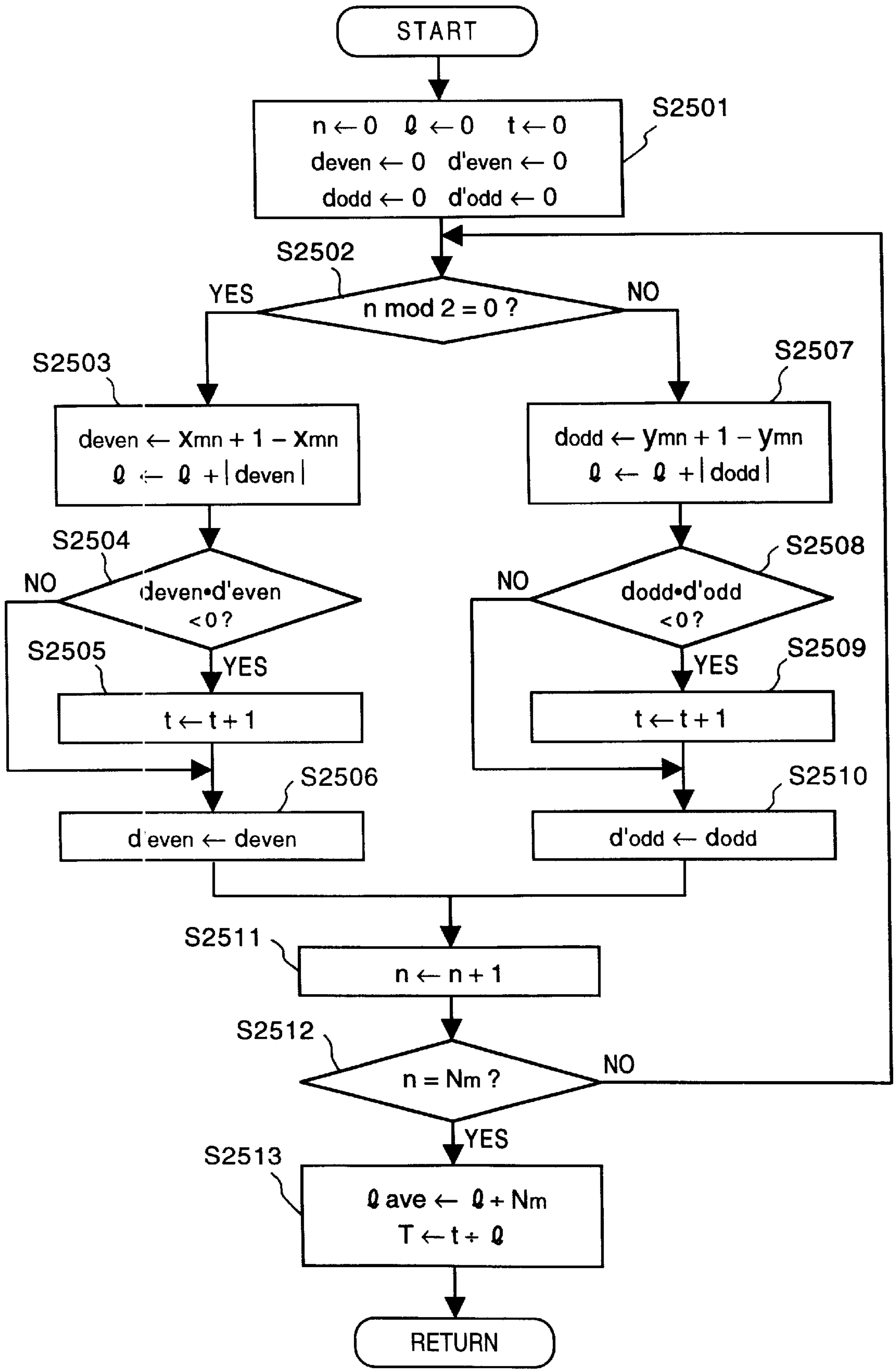
FIG. 29 is a flow chart showing the processing operation in step S2042 in FIG. 28.

FIG. 29 is a flow chart showing the processing contents in step S2042.

In step S2501, 0 is set as an initial value in a counter buffer n and temporary buffers l, t, $d_{even}$, $d'_{even}$, $d_{odd}$, and $d'_{odd}$. These variables are assured in advance on the storage device 2023.

As described above, horizontal and vertical vectors are alternately stored as contour vector data in one closed loop, and the area 2033 in the table alternately stores the start point coordinates of horizontal and vertical vectors in units of loops each starting from a horizontal vector. Therefore, it is checked in step S2502 if the value of the counter n is an even or odd number. If the value of the counter n is an even number, the flow advances to step S2503 to obtain the size $d_{even}$ of a horizontal vector ("n mod 2" in FIG. 29 means the remainder upon division of n with 2). The absolute value of $d_{even}$ is added to the vector length l accumulated so far.

In step S2504, it is checked if the direction of the horizontal vector of interest is reversed from that of the immediately preceding horizontal vector. The size of the immediately preceding horizontal vector is set in $d'_{even}$, and if the direction is reversed, $d_{even} \bullet d'_{even} < 0$ holds. In this case, the flow advances to step S2505, and 1 is added to the value t. Thereafter, the flow advances to step S2506. If it is determined in step S2504 that the direction is not reversed, the flow advances to step S2506, and the value $d_{even}$ is set in $d'_{even}$. If it is determined in step S2502 that n is an odd number, similar processing is performed for a vertical vector (steps S2507 to S2510). In step S2511, 1 is added to the value of the counter n. In step S2512, it is checked if the value n has reached the number $N_m$ of contour vectors in the m-th loop in the area 2032 of the table shown in FIG. 27. If NO in step S2512, the flow returns to step S2502.

In this manner, if the value n has reached $N_m$, the sum total of the vector lengths in the loop of interest is stored in l, and the number of times of reversal in the loop is stored in t. In step S2513, the average vector length of the m-th loop is set in lave, and a value obtained by dividing the number of times of reversal with the sum total of the vector lengths is set in T, thus ending the processing.

Therefore, in the above-mentioned flow chart shown in FIG. 28, when the average vector length is equal to or smaller than a predetermined value, and the ratio of vectors with changed directions with respect to the sum total of the vector lengths is small, the loop of interest is determined as a pseudo halftone component loop; otherwise, the loop of interest is determined as a character/line image component loop.

Figure 30:
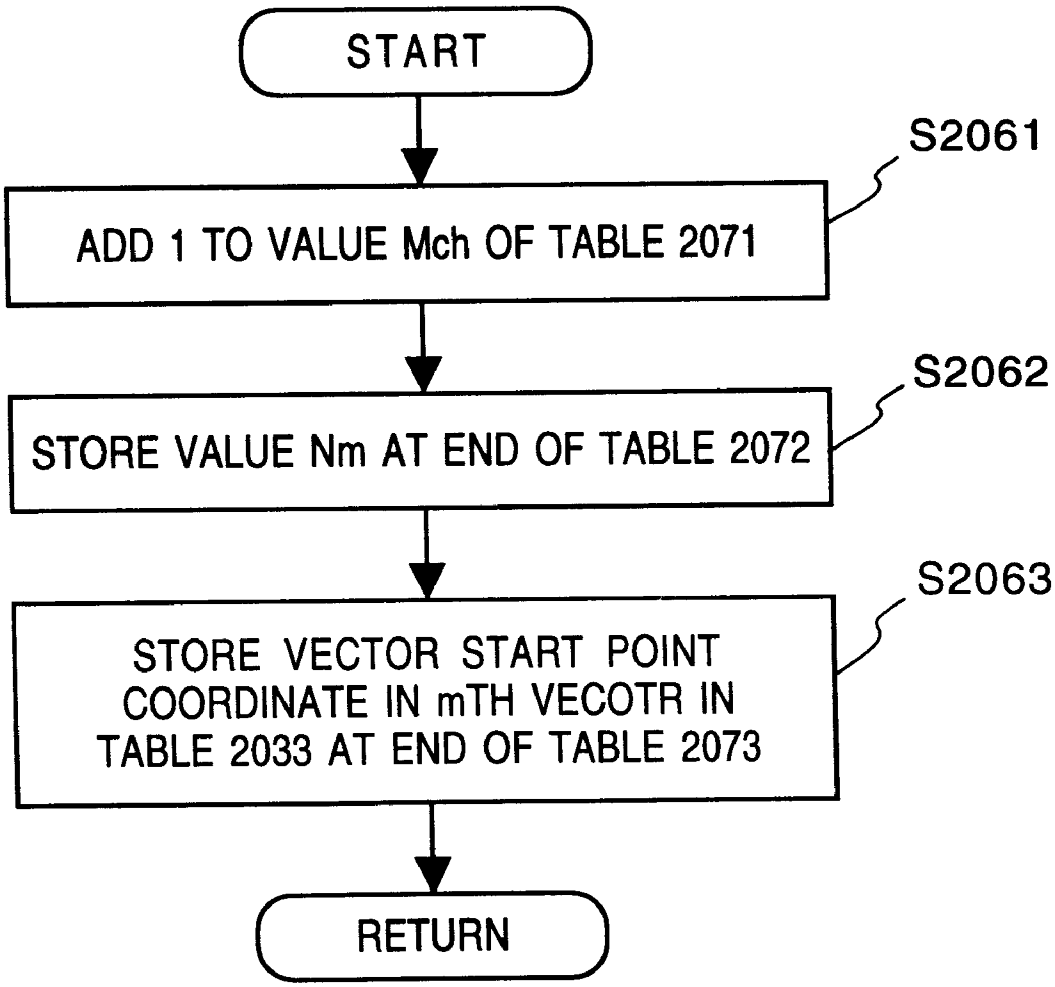
FIG. 30 is a flow chart showing the processing operation in step S2044 in FIG. 28.

The processing contents in step S2044 in FIG. 28, i.e., the processing contents for a closed loop determined as a character/line image component loop will be described below with reference to the flow chart in FIG. 30.

Figure 31:
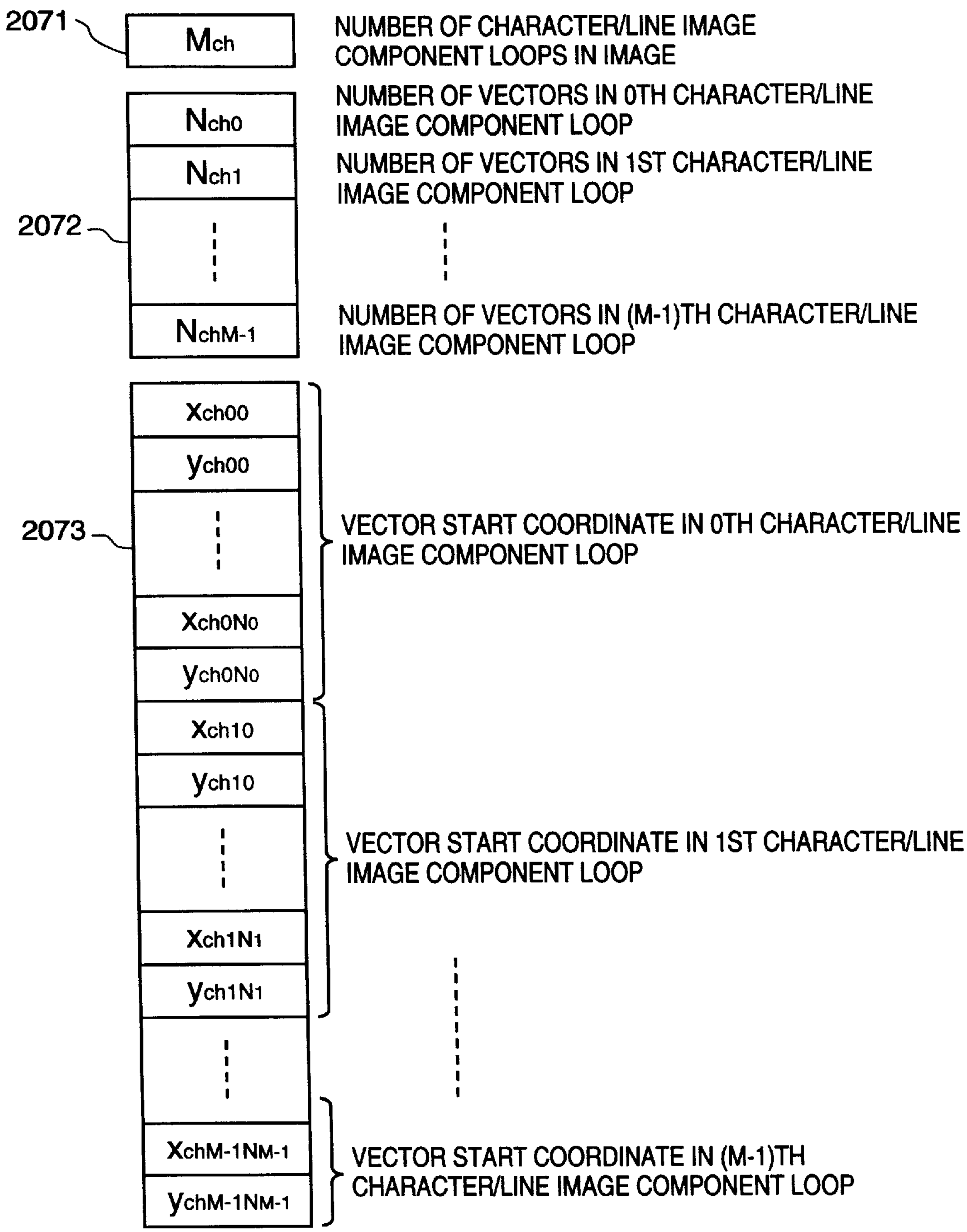
FIG. 31 is a table for storing contour vector data for character/line image components.

In step 2061, 1 is added to the value of a counter $M_{ch}$, which is denoted by reference numeral 2071 in FIG. 31. In step S2062, the value $N_m$ in the area 2032 in the table is stored at the end of an area 2072 in the table in FIG. 31. In step S2063, the start point coordinates of vectors in the m-th loop are stored in the same order at the end of an area 2073 in the table shown in FIG. 31, thus ending this processing.

In this manner, each time a character/line image component loop is detected, the table shown in FIG. 31 is updated.

Figure 32:
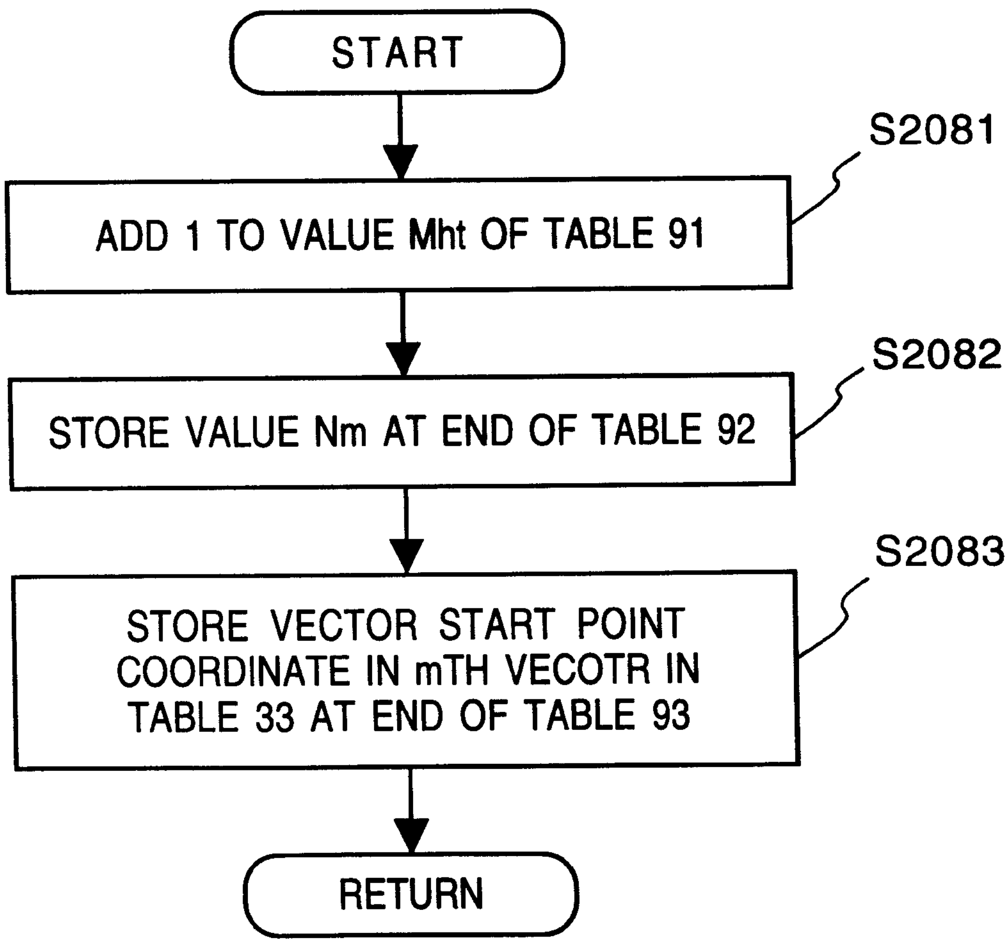
FIG. 32 is a flow chart showing the processing operation in step S2046 in FIG. 28.

On the other hand, if it is determined that the closed loop of interest is a pseudo halftone component loop, the processing shown in FIG. 32 is executed. This processing is the same as that shown in FIG. 30. In this processing, vector data of a loop determined as a pseudo halftone component loop are stored in the pseudo halftone component table shown in FIG. 33 to update this table.

The image-region separation processing in step S2013 is executed in the above-mentioned sequence.

In steps S2014 and S2015 in FIG. 25, the modification processing operations designated in step S2012 are performed for the contour vector data separated into character/line image components and pseudo halftone components. Programs of modification processing operations (e.g., enlargement, reduction, rotation, and the like) are stored in the external storage device 2027, and when specific processing contents are designated, a program to be executed is loaded onto the storage device 2023.

The modification processing results are stored in the storage device 2023 in the same formats as those shown in FIGS. 31 and 33, and a binary image is reproduced based on these contour vector data in step S2016.

In step S2017, the processing result is output to the image output device 2022 or is stored in the external storage device 2027.

Since the above-mentioned image-region separation processing (the operation in step S2013 in FIG. 25) is added, different processing operations can be adaptively performed for character/line image components and pseudo halftone components.

Upon execution of variable-magnification processing, first and second smoothing processing operations are performed for the obtained vector data (coordinate data) of a character/line image portion as post-processing. The finally obtained vector data (coordinate data) are re-calculated at a variable-magnification factor to draw a contour, and processing for filling the inside area of the contour with "1" is performed. Note that the first and second smoothing processing operations are performed in the same fashion as in the above-mentioned first embodiment. For example, in the first smoothing processing, the pattern of vectors of interest is compared with predetermined patterns, and the vectors are corrected (normally, the number of vectors is decreased). For example, at the edge of an oblique line of an input binary image, a large number of relatively short vectors are repetitively generated in the vertical and horizontal directions. Thus, processing for expressing this portion by one or several oblique vectors is performed.

Note that an isolated point (a pixel defined by "4" vectors each having a vector length of "1") may be subjected to the processing in the first embodiment.

In the second smoothing processing, a weighted means of a predetermined number of vectors (coordinate data) of a vector group constituting each loop is calculated, and the vector data are corrected. This processing is the same as that in the first embodiment.

In the binary image reproduction output processing (step S2016), the corrected vector data are enlarged/reduced in accordance with the designated variable-magnification factor, and drawing of a contour and painting of the inside area of the contour are performed.

On the other hand, if a pseudo halftone portion is subjected to the above-mentioned first and second smoothing processing operations, the ratio of the number of black pixels changes, i.e., the density changes. For this reason, vector data in only the vertical and horizontal directions obtained in step S2011 are directly subjected to variable-magnification processing, and the enlarged/reduced vector data are output.

Seventh Embodiment

In the above embodiment (the sixth embodiment), the modification processing is designated in step S2012 in FIG. 25, and the designated processing is executed in each of steps S2014 and S2015. However, the present invention is not limited to this. For example, the modification processing may be executed by a special-purpose hardware unit which is programmed to execute permanent modification processing to be executed in step S2014 and S2015 such as enlargement/reduction processing, rotation processing, and the like.

Eighth Embodiment

In the sixth embodiment, character/line image components and pseudo halftone components are separated with reference to the two feature amounts lave and T, as shown in FIG. 28. However, separation may be executed using one of these feature amounts.

For example, only the feature amount lave is calculated in step S2042. If it is determined in step S2043 that lave is larger than the threshold value lth, it is determined that the corresponding loop is a character/line image component loop, and contour vector data of this loop is stored in the character/line image component table in the storage device 2023 in step S2044; if it is determined in step S2043 that lave is smaller than the threshold value lth, it is determined that the corresponding loop is a pseudo halftone component loop, and contour vector data of this loop is stored in the pseudo halftone component table in the storage device 2023 in step S2046.

Alternatively, only the feature amount T is calculated in step S2042, and the flow advances to step S2045. If it is determined in step S2045 that T is larger than a threshold value Tth, it is determined that the corresponding loop is a character/line image component loop, and contour vector data of this loop is stored in the character/line image component table in the storage device 2023 in step S2044; if it is determined in step S2043 that T is smaller than the threshold value Tth, it is determined that the corresponding loop is a pseudo halftone component loop, and contour vector data of this loop is stored in the pseudo halftone component table in the storage device 2023 in step S2046.

In this case, although the image-region separation precision is lower than that in the sixth embodiment, since the arrangement required for this processing can be simplified, a unique effect can be obtained, i.e., the time required for the processing can be shortened.

Ninth Embodiment

In the ninth embodiment, an apparatus for performing image-region separation of an input binary image into character/line image components and pseudo halftone components and performing adaptive variable-magnification processing for each of these two different types of components will be described.

Figure 34:
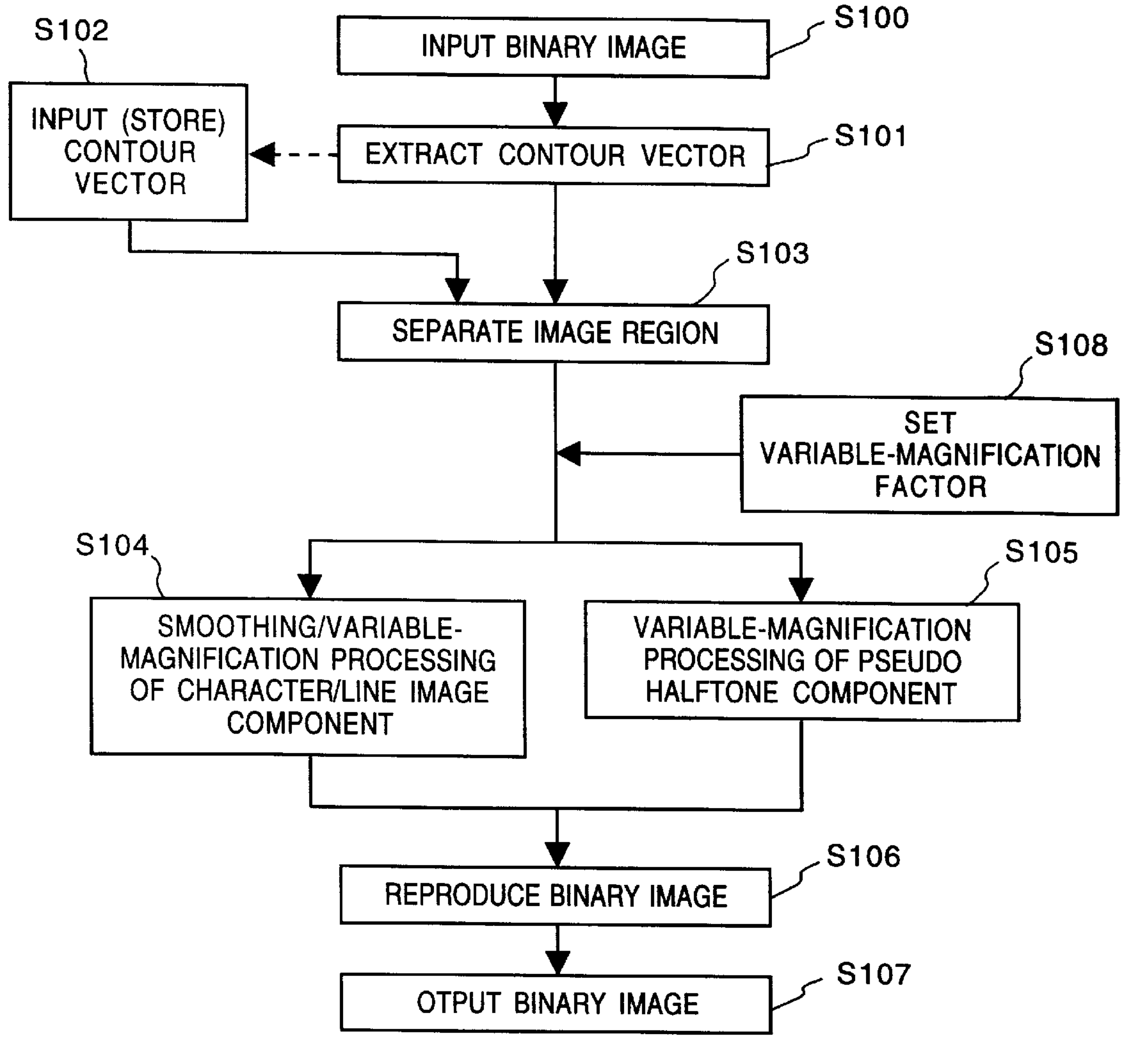
FIG. 34 is a block diagram showing the flow of processing in the ninth embodiment.

FIG. 34 is a block diagram showing the flow of the processing. FIG. 34 corresponds to FIG. 25 showing the sixth embodiment described above, and the operations in steps S2100, S2101, S2103, S2106, and S2107 are the same as those in steps S2010, S2011, S2013, S2016, and S2017 in FIG. 25.

Step S2102 executes an operation for storing contour vector data of an input image extracted in step S2101 in the external storage device or an operation for inputting the stored contour vector data to the image-region separation step (step S2103). More specifically, when variable-magnification processing of an image whose contour image data have already been stored in the external storage device 2027 is to be performed, contour vector data are input in step S2102 without going through steps S2100 and S2101. The contour vector data are input in the format shown in FIG. 27, and image-region separation results are input to steps S2104 and S2105 in the formats shown in FIGS. 31 and 33 as in the sixth embodiment.

Step S2108 is the variable-magnification setting step. This step may be realized by inputting a fixed value, which is set in advance using dip switches, a dial switch, or the like, to step S2104 or S2105, or by inputting a value using a keyboard, mouse, or the like. That is, this step is the step of inputting information indicating the main scanning (horizontal) and sub-scanning (vertical) magnification factors independently.

As for smoothing/variable-magnification processing (step S2104) of character/line image components of contour vector data separated in step S2103, means disclosed in the above-mentioned first embodiment or Japanese Patent Application No. 3-345062 is used.

On the other hand, as for variable-magnification processing (step S2105) of contour vector data of pseudo halftone components, the x- and y-coordinates of the start points of the obtained coarse outline vector data are converted in correspondence with the variable-magnification factors input in step S2108. More specifically, when the input variable-magnification factors are xm and xn in the main scanning (horizontal) direction and the sub-scanning (vertical) direction, the x- and y-coordinates of the start point of each contour vector are converted into mx and ny. The processing results in steps S2104 and S2105 are stored in the formats shown in FIGS. 31 and 33 as in the sixth embodiment, and a binary image is reproduced based on these data in step S2106.

10th Embodiment

Each of the sixth and ninth embodiments has the binary image input means and the contour vector extraction means, as shown in FIGS. 25 and 34. However, these means are not always required to realize the embodiment. More specifically, each of these embodiments may be realized by arranging means for externally inputting contour vector data.

Figure 35:
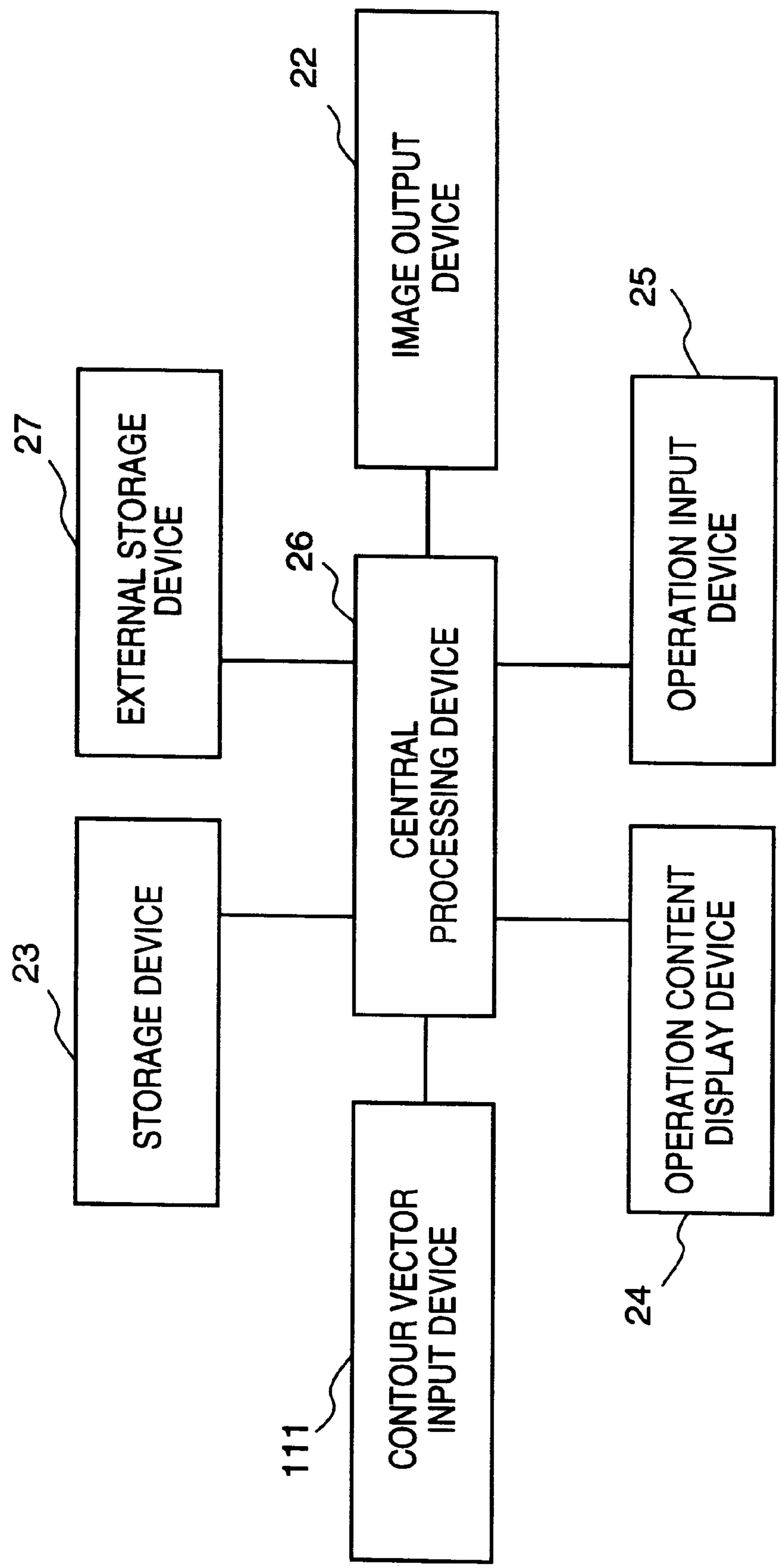
FIG. 35 is a block diagram showing the hardware arrangement in the 10th embodiment.
Figure 36:
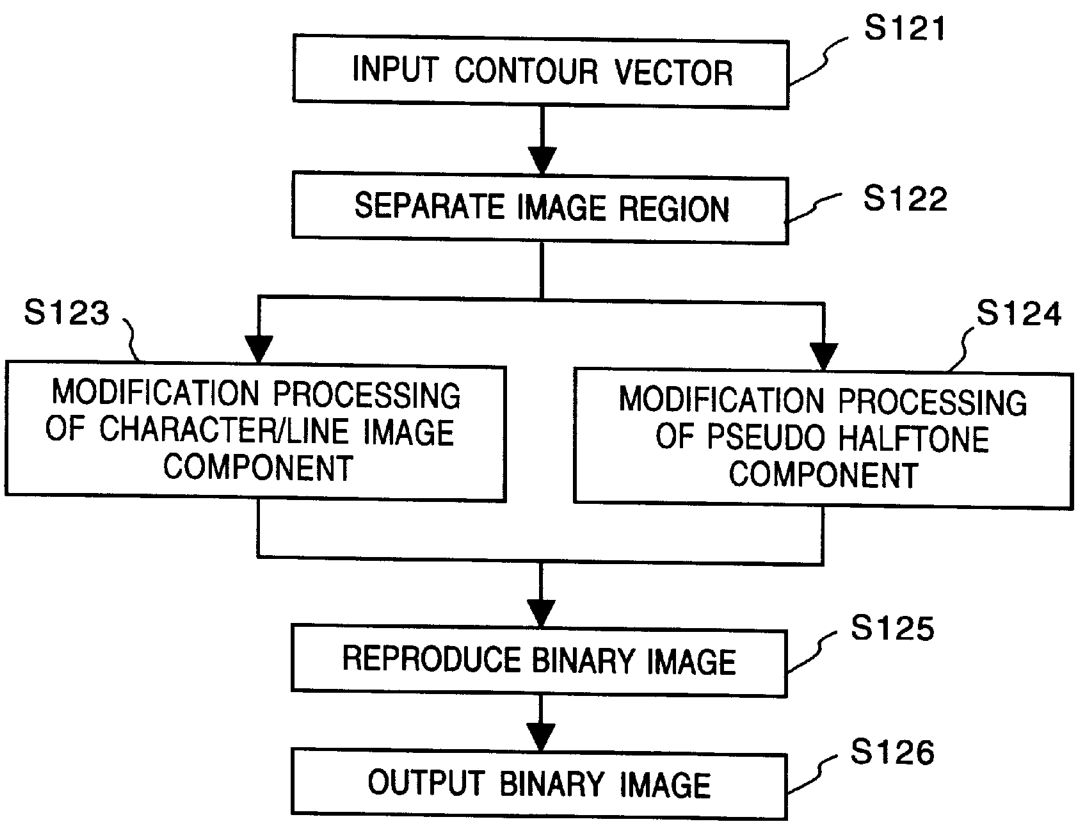
FIG. 36 is a block diagram showing the flow of processing in the 10th embodiment.
Figure 37:
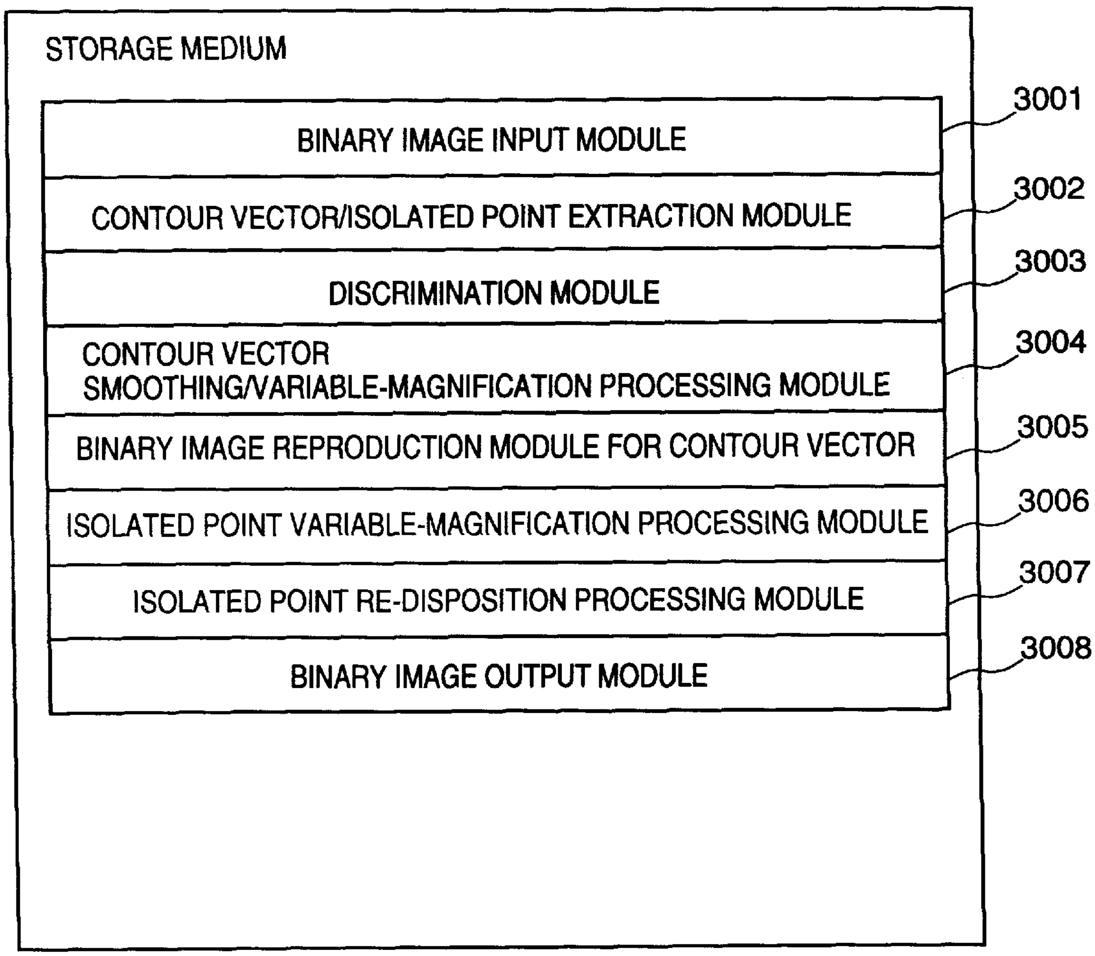
FIG. 37 is a view showing a storage medium which performs processing of the first embodiment.

As shown in the schematic block diagram of FIG. 35, a device 2111 for inputting contour vectors extracted by external contour vector extraction means via a communication path is arranged in place of the image input device to realize an embodiment for performing modification (variable-magnification) processing for externally input contour vector data. Also, contour vector data stored in the storage device 2023 may be input. FIG. 36 is a flow chart showing the flow of the processing executed in this case. Referring to FIG. 36, when contour vector data are input in step S2121, the processing in step S2122 and the subsequent steps are the same as those in step S2013 and the subsequent steps in FIG. 25, and a detailed description thereof will be omitted.

The present invention may be applied to either a system constituted by a plurality of devices or an apparatus consisting of a single device. Also, the present invention may be applied to a case wherein the invention is achieved by supplying a program to the system or apparatus, as a matter of course.

As can be easily understood from the above description of the embodiments, the output destination of a reproduced binary image is not particularly limited. For example, the reproduced binary image may be output to a printer, a facsimile apparatus (for transmitting an image), or any other devices.

As described above, according to the sixth to 10th embodiments of the present invention, an image processing apparatus for executing modification processing of contour vector data extracted from an input binary image, and converting the processed contour vector data into original raster-format data, comprises: means for extracting contour vectors by raster-scanning an input image; means for designating modification processing to be performed for the input image; separation means for separating the contour vectors extracted by the extraction means into character/line image components and pseudo halftone components; first processing means for executing the modification processing designated by the designation means for the contour vectors of the character/line image components separated by the separation means; and second processing means for executing the modification processing designated by the designation means for contour vectors of the pseudo halftone components separated by the separation means, wherein the vector data of the character/line image components and the pseudo halftone components, which are modified by the first and second processing means, can be adaptively and separately processed.

In addition, when the first processing means comprises means disclosed in, e.g., the first embodiment or Japanese Patent Application No. 3-345062, and the second processing means comprises variable-magnification means for converting the start point coordinates of contour vectors in correspondence with variable-magnification factors, a satisfactorily enlarged/reduced image can be obtained.

As described above, according to the sixth to 10th embodiments, the contour vectors of an input binary image can be separated into contour vectors of character/line image components and those of pseudo halftone image components, and the separated vectors can be subjected to optimal processing as post-processing.

According to another invention, even when binary image data including both a character/line image portion and a pseudo halftone image portion is input, these image portions can be separated from each other, and the separated image portions can be subjected to optimal modification processing.

Other Embodiments

Most of processing in each of the first to 10th embodiments can be realized by a program executed by a CPU. In other words, each of embodiments described in the present invention may be practiced in such a manner that programs corresponding to the flow charts of each embodiment are stored in a storage medium such as a floppy disk, a magneto-optical disk, a CD-ROM, a memory card, or the like, a required program is loaded into a memory, and the loaded program is executed by the CPU.

Therefore, the present invention is not limited to the specific hardware apparatus described in each of the above embodiments, but may be realized by supplying a program to a versatile apparatus. For this reason, the present invention can be applied to a storage medium.

For example, in the case of the first embodiment, as shown in FIG. 36, the storage medium stores a binary image input module code 3001 for performing a binary image input operation, a module code 3002 for extracting contour vectors and isolated points from the input binary image, a discrimination module code 3003 for discriminating isolated points, a module code 3004 for performing smoothing processing and variable-magnification processing for contour vector data of a non-isolated point binary image, a module code 3005 for reproducing binary image data on the basis of the vector data after the smoothing processing and the variable-magnification processing, a module code 3006 for performing variable-magnification processing effective for isolated points, a module code 3007 for re-disposing enlarged/reduced isolated point images on the reproduced non-isolated point binary image, and a module code 3008 for outputting the obtained binary image to a designated output device.

On the other hand, in the case of the sixth embodiment, a storage medium stores module codes corresponding to the respective steps in FIG. 25, as can be easily understood from the above description.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

detection means for detecting an isolated point from an inputted image;

first generating means for variably magnifying the isolated point detected by said detection means using a magnification ratio represented by a fraction, and for generating an image consisting of the variably magnified isolated point;

second generating means for extracting contour vectors from the inputted image except at said isolated point, variably magnifying the extracted contour vectors using said magnification ratio, and generating an image on the basis of the magnified contour vectors; and synthesizing means for synthesizing the image generated by said first generating means and the image generated by said second generating means, wherein said first generating means includes (a) pixel data generating means for magnifying the isolated point by generating pixel data for an integer number of pixels, (b) calculating means for calculating a difference between the number of pixels generated by said pixel data generating means and a power of said magnification ratio, (c) accumulating means for accumulating the difference calculated by said calculating means and for holding the accumulated difference, (d) correction means for correcting the integer number of pixels for which data is generated by said pixel data generating means, in accordance with the difference accumulated by said accumulating means, and (e) repetition means for repeating the operations performed by means (a)–(d) until variable magnification of the isolated point is complete.

2. The image processing apparatus according to claim 1, wherein said magnification ratio includes vertical and horizontal magnification ratios which can be designated independently, and said power is represented by the product of said vertical and horizontal magnification ratios.

3. The image processing apparatus according to claim 1, further comprising printing means for printing the image synthesized by said synthesizing means.

4. The image processing apparatus according to claim 1, further comprising displaying means for displaying the image synthesized by said synthesizing means.

5. The image processing apparatus according to claim 1, further comprising input means for inputting an original image.

6. An image processing method comprising:

a step of detecting an isolated point from an inputted image;

a first generating step of variably magnifying the isolated point detected in said detecting using a magnification ratio represented by a fraction, and for generating an image consisting of the variably magnified isolated point;

a second generating step of extracting contour vectors from the inputted image except at the isolated point, variably magnifying the extracted contour vectors using the magnification ratio, and generating an image on the basis of the magnified contour vectors; and a step of synthesizing the image generated in said first generating step and the image generated in said second generating step, wherein said first generating step includes (a) a pixel data generating step for magnifying the isolated point by generating pixel data for an integer number of pixels, (b) a calculating step for calculating a difference between the number of pixels generated in said pixel data generating step and a power of the magnification ratio, (c) an accumulating step for accumulating the difference calculated in said calculating step and for holding the accumulated difference, (d) a correction step for correcting the integer number of pixels for which data is generated in said pixel data generating step, in accordance with the difference accumulated in said accumulating step, and (e) a repetition step for repeating the operations performed in steps (a)–(d) until variable magnification of the isolated point is complete.

7. The image processing method according to claim 6, wherein the magnification ratio includes vertical and horizontal magnification ratios which can be designated independently, and the power is represented by the product of the vertical and horizontal magnification ratios.

8. The image processing method according to claim 6, further comprising the step of printing the image synthesized in said synthesizing step.

9. The image processing method according to claim 6, further comprising the step of displaying the image synthesized in said synthesizing step.

10. The image processing method according to claim 6, further comprising the step of inputting an original image.

11. Computer executable process steps, stored on a computer readable medium, comprising:

a step to detect an isolated point from an inputted image;

a first generating step to variably magnify the isolated point detected in said detecting step using a magnification ratio represented by a fraction, and for generating an image consisting of the variably magnified isolated point;

a second generating step to extract contour vectors from the inputted image except at the isolated point, variably magnify the extracted contour vectors using the magnification ratio, and generate an image on the basis of the magnified contour vectors; and a step to synthesize the image generated in said first generating step and the image generated in said second generating step, wherein said first generating step includes (a) a pixel data generating step for magnifying the isolated point by generating pixel data for an integer number of pixels, (b) a calculating step for calculating a difference between the number of pixels generated in said pixel data generating step and a power of the magnification ratio, (c) an accumulating step for accumulating the difference calculated in said calculating step and for holding the accumulated difference, (d) a correction step for correcting the integer number of pixels for which data is generated in said pixel data generating step, in accordance with the difference accumulated in said accumulating step, and (e) a repetition step for repeating the operations performed in steps (a)–(d) until variable magnification of the isolated point is complete.

12. The computer executable process steps according to claim 11, wherein the magnification ratio includes vertical and horizontal magnification ratios which can be designated independently, and the power is represented by the product of the vertical and horizontal magnification ratios.

13. The computer executable process steps according to claim 11, further comprising a step to print the image synthesized in said synthesizing step.

14. The computer executable process steps according to claim 11, further comprising a step to display the image synthesized in said synthesizing step.

15. The computer executable process steps according to claim 11, further comprising a step to input an original image.

16. The apparatus according to claim 2, wherein said first generating means further comprises converting means for converting said vertical and horizontal magnification ratios into integers, and wherein the integer number of pixels generated by said pixel data generating means corresponds to a product of the integers obtained by said converting means.

17. The image processing apparatus according to claim 1, wherein said first generating means directly generates an image consisting of the variably magnified isolated points on the image generated by said second generating means.

18. The image processing apparatus according to claim 1, wherein said pixel data generating means includes means for storing generated pixel data as coordinate data in a predetermined memory.

19. The method according to claim 7, wherein said first generating step further comprises a step of converting said vertical and horizontal magnification ratios into integers, and wherein the integer number of pixels generated in said pixel data generating step corresponds to a product of the integers obtained in said converting step.

20. The method according to claim 6, wherein said first generating step directly generates an image consisting of the variably magnified isolated points on the image generated in said second generating step.

21. The method according to claim 6, wherein said pixel data generating step includes a step of storing generated pixel data as coordinate data.

22. The computer executable process steps according to claim 12, wherein said first generating step further comprises a step of converting said vertical and horizontal magnification ratios into integers, and wherein the integer number of pixels generated in said pixel data generating step corresponds to a product of the integers obtained in said converting step.

23. The computer executable process steps according to claim 11, wherein said first generating step directly generates an image consisting of the variably magnified isolated points on the image generated in said second generating step.

24. The computer executable process steps according to claim 11, wherein said pixel data generating step includes a step of storing generated pixel data as coordinate data.

* * * * *

UNITED STATES PATENT AND TRADEMARK OFFICE

CERTIFICATE OF CORRECTION

PATENT NO. : 5,974,195 Page 1 of 1
DATED : October 26, 1999
INVENTOR(S) : Takeshi Kawazome et al.

It is certified that error appears in the above-identified patent and that said Letters Patent is hereby corrected as shown below:

Title page:
Column [56]:
In References Cited, under FOREIGN PATENT DOCUMENTS, -- 5,193,126 4/1993 Matsuki -- should be inserted.

Column 9,
Line 58, "N'" should read -- Q' --.

Column 10,
Line 3, "N." should read -- MN. --.

Column 13,
Line 46, "save" should read -- ℓave --.

Column 19,
Line 64, "detecting" should read -- detecting step --.

Signed and Sealed this

Twenty-eighth Day of August, 2001

*Attest:*

NICHOLAS P. GODICI

*Attesting Officer* *Acting Director of the United States Patent and Trademark Office*